United States Patent
Amiya et al.

(10) Patent No.: US 9,141,269 B2
(45) Date of Patent: Sep. 22, 2015

(54) DISPLAY SYSTEM PROVIDED WITH FIRST DISPLAY DEVICE AND SECOND DISPLAY DEVICE

(71) Applicants: Koichi Amiya, Anjo (JP); Takatsugu Kuno, Toyokawa (JP); Hiroshi Murakami, Nagoya (JP); Yusaku Tanaka, Toyokawa (JP); Hiroshi Iwamoto, Toyohashi (JP); Kenichi Sawada, Toyohashi (JP)

(72) Inventors: Koichi Amiya, Anjo (JP); Takatsugu Kuno, Toyokawa (JP); Hiroshi Murakami, Nagoya (JP); Yusaku Tanaka, Toyokawa (JP); Hiroshi Iwamoto, Toyohashi (JP); Kenichi Sawada, Toyohashi (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 117 days.

(21) Appl. No.: 13/681,442

(22) Filed: Nov. 20, 2012

(65) Prior Publication Data

US 2013/0127688 A1 May 23, 2013

(30) Foreign Application Priority Data

Nov. 21, 2011 (JP) ................................. 2011-253779

(51) Int. Cl.
*G06F 3/0485* (2013.01)
*G06F 3/0488* (2013.01)
(Continued)

(52) U.S. Cl.
CPC ............ *G06F 3/0485* (2013.01); *G06F 3/0482* (2013.01); *G06F 3/04883* (2013.01);
(Continued)

(58) Field of Classification Search
CPC ............ G09G 5/00; G09G 2340/0407; G09G 2340/0464; G09G 2340/0471; G09G 2340/0478; G09G 2340/0485; G09G 2340/0492; G06F 3/14; G06F 3/1454; G06F 3/1462; G06F 3/048; G06F 3/0481; G06F 3/0482; G06F 3/04883; G06F 3/0485; G06F 2203/0383; H04N 1/00204; H04N 1/00408; H04N 2201/001; H04N 2201/0039; H04N 2201/0055; H04N 2201/0094; H04N 2201/00
USPC .......................................... 715/812, 788, 769
See application file for complete search history.

(56) References Cited

U.S. PATENT DOCUMENTS

| | | | |
|---|---|---|---|
| 7,506,261 B2 * | 3/2009 | Satou et al. ................... | 715/740 |
| 2010/0289754 A1* | 11/2010 | Sleeman et al. .............. | 345/173 |
| 2010/0306702 A1* | 12/2010 | Warner ......................... | 715/811 |
| 2011/0080351 A1* | 4/2011 | Wikkerink et al. ........... | 345/173 |

(Continued)

FOREIGN PATENT DOCUMENTS

| | | |
|---|---|---|
| JP | 03-252698 A | 11/1991 |
| JP | 04-342020 A | 11/1992 |

(Continued)

OTHER PUBLICATIONS

Office Action (Notice of Allowance) issued by the Japanese Patent Office on Oct. 29, 2013 in corresponding Japanese Patent Application No. 2011-253779 and an English translation of the Official Action. (5 pages).

*Primary Examiner* — Dwayne Bost
*Assistant Examiner* — Ivelisse Martinez Quiles
(74) *Attorney, Agent, or Firm* — Buchanan Ingersoll & Rooney PC

(57) ABSTRACT

A display system includes an image forming device and a mobile communication terminal. In the display system, the mobile communication terminal accepts a flick manipulation to move the screen, and transmits flick information on the accepted flick manipulation to the image forming device. The image forming device decides an area, which is a part of the screen of the mobile communication terminal and in which display is changed when the screen is moving, and sequentially transmits to the mobile communication terminal positional information on the decided area and screen data of the screen before the movement is completed since the movement is started, which is decided based on the flick information in the decided area. The mobile communication terminal displays the screen in the area of the transmitted positional information based on the transmitted screen data.

20 Claims, 25 Drawing Sheets

(51) Int. Cl.
*G06F 3/0482* (2013.01)
*G06F 3/14* (2006.01)
*H04N 1/00* (2006.01)
*G09G 5/00* (2006.01)

(52) U.S. Cl.
CPC .......... *G06F3/1454* (2013.01); *H04N 1/00204* (2013.01); *H04N 1/00408* (2013.01); *G06F 2203/0383* (2013.01); *G09G 5/00* (2013.01); *G09G 2340/0407* (2013.01); *G09G 2340/0464* (2013.01); *G09G 2370/16* (2013.01); *H04N 2201/001* (2013.01); *H04N 2201/0039* (2013.01); *H04N 2201/0055* (2013.01); *H04N 2201/0094* (2013.01)

(56) References Cited

U.S. PATENT DOCUMENTS

| | | | |
|---|---|---|---|
| 2012/0139952 A1* | 6/2012 | Imai et al. | 345/672 |
| 2012/0249466 A1 | 10/2012 | Ito et al. | |
| 2012/0266068 A1* | 10/2012 | Ryman et al. | 715/719 |
| 2013/0063384 A1 | 3/2013 | Ito | |

FOREIGN PATENT DOCUMENTS

| | | |
|---|---|---|
| JP | 11-296270 A | 10/1999 |
| JP | 2004-193949 A | 7/2004 |
| JP | 2005-135047 A | 5/2005 |
| JP | 2011-135525 A | 7/2011 |
| WO | WO 2011/077921 A1 | 6/2011 |
| WO | 2011/142069 A1 | 11/2011 |

* cited by examiner

FIG.4

(a) 220(2), REG1, PO1, PO2, SB1, SB2

| REGISTRATION NUMBER | TRANSMISSION TYPE | NAME | ROMAN CHARACTER | DESTINATION |
|---|---|---|---|---|
| 1 | E-mail | 松本 武 | TAKESHI MATSUMOTO | abc@abc.co.jp |
| 2 | FAX | 坂野 豊 | YUTAKA SAKANO | 0120-1234-5678 |
| 3 | SMB | 高橋 千宏 | CHIHIRO TAKAHASHI | 222.44.55.123 |
| 4 | FTP | 菊田 真紀 | MAKI KIKUTA | ftp://100.0.0.789 |
| 5 | SMB | 山花 幸夫 | YUKIO YAMAHANA | 222.44.55.456 |
| 6 | E-mail | 徳永 弘 | HIROSHI TOKUNAGA | def@abc.co.jp |
| 7 | E-mail | 垂井 すみ子 | SUMIKO TARUI | kia@abc.co.jp |
| 8 | FTP | 別所 浩三 | KOZO BESSYO | ftp://100.0.0.456 |
| 9 | E-mail | 西宮 健一 | KENNICHI NISHIMIYA | jkl@abc.co.jp |
| 10 | E-mail | コニカミノルタ | KONICA MINOLTA | konica@minolta.com |
| 11 | FAX | 小田 信岳 | NOBUTAKE ODA | 0120-1234-6666 |
| 12 | E-mail | 中島 貴明 | TAKAAKI NAKAZIMA | mno@abc.co.jp |
| 13 | E-mail | 坂場 義男 | YOSHIO SAKABA | prq@abc.co.jp |
| 14 | FAX | 山下 信 | MAKOTO YAMASHITA | 0120-1234-6543 |
| 15 | FTP | 山本 道只 | MICHITADA YAMAMOTO | ftp:/100.0.0.123 |
| 16 | E-mail | 堂道 秀樹 | HIDEKI DOUMITI | stu@abc.co.jp |
| 17 | FAX | 堀 雅彦 | MASAHIKO HORI | 0120-1234-9997 |

(b) 134(130)

| REGISTRATION NUMBER | TRANSMISSION TYPE | NAME | ROMAN CHARACTER | DESTINATION |
|---|---|---|---|---|
| 1 | E-mail | 松本 武 | TAKESHI MATSUMOTO | abc@abc.co.jp |
| 2 | FAX | 坂野 豊 | YUTAKA SAKANO | 0120-1234-5678 |
| 3 | SMB | 高橋 千宏 | CHIHIRO TAKAHASHI | 222.44.55.123 |
| 4 | FTP | 菊田 真紀 | MAKI KIKUTA | ftp://100.0.0.789 |
| 5 | SMB | 山花 幸夫 | YUKIO YAMAHANA | 222.44.55.456 |
| 6 | E-mail | 徳永 弘 | HIROSHI TOKUNAGA | def@abc.co.jp |
| 7 | E-mail | 垂井 すみ子 | SUMIKO TARUI | kia@abc.co.jp |
| 8 | FTP | 別所 浩三 | KOZO BESSYO | ftp://100.0.0.456 |
| 9 | E-mail | 西宮 健一 | KENNICHI NISHIMIYA | jkl@abc.co.jp |
| 10 | E-mail | コニカミノルタ | KONICA MINOLTA | konica@minolta.com |
| 11 | FAX | 小田 信岳 | NOBUTAKE ODA | 0120-1234-6666 |
| 12 | E-mail | 中島 貴明 | TAKAAKI NAKAZIMA | mno@abc.co.jp |
| 13 | E-mail | 坂場 義男 | YOSHIO SAKABA | prq@abc.co.jp |
| 14 | FAX | 山下 信 | MAKOTO YAMASHITA | 0120-1234-6543 |
| 15 | FTP | 山本 道只 | MICHITADA YAMAMOTO | ftp:/100.0.0.123 |
| 16 | E-mail | 堂道 秀樹 | HIDEKI DOUMITI | stu@abc.co.jp |
| 17 | FAX | 堀 雅彦 | MASAHIKO HORI | 0120-1234-9997 |

| REGISTRATION NUMBER | TRANSMISSION TYPE | NAME | ROMAN CHARACTER | DESTINATION |
|---|---|---|---|---|
| 1 | E-mail | 山花 幸夫 | TAKESHI MATSUMOTO | abc@abc.co.jp |
| 2 | FAX | 德永 弘 | YUTAKA SAKANO | 0120-1234-5678 |
| 3 | SMB | 垂井 すみ子 | CHIHIRO TAKAHASHI | 222.44.55.123 |
| 4 | FTP | 別所 浩三 | MAKI KIKUTA | ftp://100.0.0.789 |
| 5 | SMB | 西宮 健一 | YUKIO YAMAHANA | 222.44.55.456 |
| 6 | E-mail | コニカミノルタ | HIROSHI TOKUNAGA | def@abc.co.jp |
| 7 | E-mail | 小田 信岳 | SUMIKO TARUI | kia@abc.co.jp |
| 8 | FTP | 中島 貴明 | KOZO BESSYO | ftp://100.0.0.456 |
| 9 | E-mail | 坂場 義男 | KENNICHI NISHIMIYA | jkl@abc.co.jp |
| 10 | E-mail | 山下 信 | KONICA MINOLTA | konica@minolta.com |
| 11 | FAX | 山本 道只 | NOBUTAKE ODA | 0120-1234-6666 |
| 12 | E-mail | 堂道 秀樹 | TAKAAKI NAKAZIMA | mno@abc.co.jp |
| 13 | E-mail | 堀 雅彦 | YOSHIO SAKABA | prq@abc.co.jp |
| 14 | FAX | 貴寺 眞人 | MAKOTO YAMASHITA | 0120-1234-6543 |
| 15 | FTP | 小寺 昌喜 | MICHITADA YAMAMOTO | ftp:/100.0.0.123 |
| 16 | E-mail | 稲葉 一平 | HIDEKI DOUMITI | stu@abc.co.jp |
| 17 | FAX | 新見 純一 | MASAHIKO HORI | 0120-1234-9997 |

REG1, SB1, SB2

(b) 134(130)

| REGISTRATION NUMBER | TRANSMISSION TYPE | NAME | ROMAN CHARACTER | DESTINATION |
|---|---|---|---|---|
| 5 | SMB | 山花 幸夫 | YUKIO YAMAHANA | 222.44.55.456 |
| 6 | E-mail | 德永 弘 | HIROSHI TOKUNAGA | def@abc.co.jp |
| 7 | E-mail | 垂井 すみ子 | SUMIKO TARUI | kia@abc.co.jp |
| 8 | FTP | 別所 浩三 | KOZO BESSYO | ftp://100.0.0.456 |
| 9 | E-mail | 西宮 健一 | KENNICHI NISHIMIYA | jkl@abc.co.jp |
| 10 | E-mail | コニカミノルタ | KONICA MINOLTA | konica@minolta.com |
| 11 | FAX | 小田 信岳 | NOBUTAKE ODA | 0120-1234-6666 |
| 12 | E-mail | 中島 貴明 | TAKAAKI NAKAZIMA | mno@abc.co.jp |
| 13 | E-mail | 坂場 義男 | YOSHIO SAKABA | prq@abc.co.jp |
| 14 | FAX | 山下 信 | MAKOTO YAMASHITA | 0120-1234-6543 |
| 15 | FTP | 山本 道只 | MICHITADA YAMAMOTO | ftp:/100.0.0.123 |
| 16 | E-mail | 堂道 秀樹 | HIDEKI DOUMITI | stu@abc.co.jp |
| 17 | FAX | 堀 雅彦 | MASAHIKO HORI | 0120-1234-9997 |
| 18 | FAX | 貴寺 眞人 | MASATO KITERA | 0120-1234-9997 |
| 19 | E-mail | 小寺 昌喜 | MASAKI KODERA | RTUI@abc.co.jp |
| 20 | FAX | 稲葉 一平 | IPPEI INABA | 0120-1111-6789 |
| 21 | FAX | 新見 純一 | JUNNICHI NIIMI | 0120-2222-5678 |

| REGISTRATION NUMBER | TRANSMISSION TYPE | NAME | ROMAN CHARACTER | DESTINATION |
|---|---|---|---|---|
| 1 | E-mail | 垂井　すみ子 | TAKESHI MATSUMOTO | abc@abc.co.jp |
| 2 | FAX | 別所　浩三 | YUTAKA SAKANO | 0120-1234-5678 |
| 3 | SMB | 西宮　健一 | CHIHIRO TAKAHASHI | 222.44.55.123 |
| 4 | FTP | コニカミノルタ | MAKI KIKUTA | ftp://100.0.0.789 |
| 5 | SMB | 小田　信岳 | YUKIO YAMAHANA | 222.44.55.456 |
| 6 | E-mail | 中島　貴明 | HIROSHI TOKUNAGA | def@abc.co.jp |
| 7 | E-mail | 坂場　義男 | SUMIKO TARUI | kia@abc.co.jp |
| 8 | FTP | 山下　信 | KOZO BESSYO | ftp://100.0.0.456 |
| 9 | E-mail | 山本　道只 | KENNICHI NISHIMIYA | jkl@abc.co.jp |
| 10 | E-mail | 堂道　秀樹 | KONICA MINOLTA | konica@minolta.com |
| 11 | FAX | 堀　雅彦 | NOBUTAKE ODA | 0120-1234-6666 |
| 12 | E-mail | 貴寺　眞人 | TAKAAKI NAKAZIMA | mno@abc.co.jp |
| 13 | E-mail | 小寺　昌喜 | YOSHIO SAKABA | prq@abc.co.jp |
| 14 | FAX | 稲葉　一平 | MAKOTO YAMASHITA | 0120-1234-6543 |
| 15 | FTP | 新見　純一 | MICHITADA YAMAMOTO | ftp:/100.0.0.123 |
| 16 | E-mail | 伊重　信 | HIDEKI DOUMITI | stu@abc.co.jp |
| 17 | FAX | 吉田　友之 | MASAHIKO HORI | 0120-1234-9997 |

(b)

| REGISTRATION NUMBER | TRANSMISSION TYPE | NAME | ROMAN CHARACTER | DESTINATION |
|---|---|---|---|---|
| 7 | E-mail | 垂井　すみ子 | SUMIKO TARUI | kia@abc.co.jp |
| 8 | FTP | 別所　浩三 | KOZO BESSYO | ftp://100.0.0.456 |
| 9 | E-mail | 西宮　健一 | KENNICHI NISHIMIYA | jkl@abc.co.jp |
| 10 | E-mail | コニカミノルタ | KONICA MINOLTA | konica@minolta.com |
| 11 | FAX | 小田　信岳 | NOBUTAKE ODA | 0120-1234-6666 |
| 12 | E-mail | 中島　貴明 | TAKAAKI NAKAZIMA | mno@abc.co.jp |
| 13 | E-mail | 坂場　義男 | YOSHIO SAKABA | prq@abc.co.jp |
| 14 | FAX | 山下　信 | MAKOTO YAMASHITA | 0120-1234-6543 |
| 15 | FTP | 山本　道只 | MICHITADA YAMAMOTO | ftp:/100.0.0.123 |
| 16 | E-mail | 堂道　秀樹 | HIDEKI DOUMITI | stu@abc.co.jp |
| 17 | FAX | 堀　雅彦 | MASAHIKO HORI | 0120-1234-9997 |
| 18 | FAX | 貴寺　眞人 | MASATO KITERA | 0120-1234-9997 |
| 19 | E-mail | 小寺　昌喜 | MASAKI KODERA | RTUI@abc.co.jp |
| 20 | FAX | 稲葉　一平 | IPPEI INABA | 0120-1111-6789 |
| 21 | FAX | 新見　純一 | JUNNICHI NIIMI | 0120-2222-5678 |
| 22 | FAX | 伊重　信 | MAKOTO IZYU | 0120-7777-1267 |
| 23 | FAX | 吉田　友之 | TOMOYUKI YOSHIDA | 0120-2222-6543 |

| REGISTRATION NUMBER | TRANSMISSION TYPE | NAME | ROMAN CHARACTER | DESTINATION |
|---|---|---|---|---|
| 10 | E-mail | コニカミノルタ | KONICA MINOLTA | konica@minolta.com |
| 11 | FAX | 小田 信岳 | NOBUTAKE ODA | 0120-1234-6666 |
| 12 | E-mail | 中島 貴明 | TAKAAKI NAKAZIMA | mno@abc.co.jp |
| 13 | E-mail | 坂場 義男 | YOSHIO SAKABA | prq@abc.co.jp |
| 14 | FAX | 山下 信 | MAKOTO YAMASHITA | 0120-1234-6543 |
| 15 | FTP | 山本 道只 | MICHITADA YAMAMOTO | ftp:/100.0.0.123 |
| 16 | E-mail | 堂道 秀樹 | HIDEKI DOUMITI | stu@abc.co.jp |
| 17 | FAX | 堀 雅彦 | MASAHIKO HORI | 0120-1234-9997 |
| 18 | FAX | 貴寺 眞人 | MASATO KITERA | 0120-1234-9997 |
| 19 | E-mail | 小寺 昌喜 | MASAKI KODERA | RTUI@abc.co.jp |
| 20 | FAX | 稲葉 一平 | IPPEI INABA | 0120-1111-6789 |
| 21 | FAX | 新晃 純一 | JUNNICHI NIIMI | 0120-2222-5678 |
| 22 | FAX | 伊重 信 | MAKOTO IZYU | 0120-7777-1267 |
| 23 | FAX | 吉田 友之 | TOMOYUKI YOSHIDA | 0120-2222-6543 |
| 24 | E-mail | 舵 隆文 | TAKAHUMI KAJI | kaji@abc.co.jp |
| 25 | E-mail | 上田 昌子 | MASAKO UEDA | ueda@abc.co.jp |
| 26 | FAX | 野田 久仁 | HISAHIKO NODA | 0120-1254-6699 |

AUTO COLOR / COLOR — AUTO / READ DOCUMENT SIZE — S 200dpi F FINE / RESOLUTION — PDF / FILE FORMAT — SINGLE / SINGLE/DOUBLE — OFF / TITLE/SUBJECT/OTHER (b)

| REGISTRATION NUMBER | TRANSMISSION TYPE | NAME | ROMAN CHARACTER | DESTINATION |
|---|---|---|---|---|
| 10 | E-mail | コニカミノルタ | KONICA MINOLTA | konica@minolta.com |
| 11 | FAX | 小田 信岳 | NOBUTAKE ODA | 0120-1234-6666 |
| 12 | E-mail | 中島 貴明 | TAKAAKI NAKAZIMA | mno@abc.co.jp |
| 13 | E-mail | 坂場 義男 | YOSHIO SAKABA | prq@abc.co.jp |
| 14 | FAX | 山下 信 | MAKOTO YAMASHITA | 0120-1234-6543 |
| 15 | FTP | 山本 道只 | MICHITADA YAMAMOTO | ftp:/100.0.0.123 |
| 16 | E-mail | 堂道 秀樹 | HIDEKI DOUMITI | stu@abc.co.jp |
| 17 | FAX | 堀 雅彦 | MASAHIKO HORI | 0120-1234-9997 |
| 18 | FAX | 貴寺 眞人 | MASATO KITERA | 0120-1234-9997 |
| 19 | E-mail | 小寺 昌喜 | MASAKI KODERA | RTUI@abc.co.jp |
| 20 | FAX | 稲葉 一平 | IPPEI INABA | 0120-1111-6789 |
| 21 | FAX | 新晃 純一 | JUNNICHI NIIMI | 0120-2222-5678 |
| 22 | FAX | 伊重 信 | MAKOTO IZYU | 0120-7777-1267 |
| 23 | FAX | 吉田 友之 | TOMOYUKI YOSHIDA | 0120-2222-6543 |
| 24 | E-mail | 舵 隆文 | TAKAHUMI KAJI | kaji@abc.co.jp |
| 25 | E-mail | 上田 昌子 | MASAKO UEDA | ueda@abc.co.jp |
| 26 | FAX | 野田 久仁 | HISAHIKO NODA | 0120-1254-6699 |

AUTO COLOR / COLOR — AUTO / READ DOCUMENT SIZE — S 200dpi F FINE / RESOLUTION — PDF / FILE FORMAT — SINGLE / SINGLE/DOUBLE — OFF / TITLE/SUBJECT/OTHER

FIG.15

| REGISTRATION NUMBER | TRANSMISSION TYPE | NAME | ROMAN CHARACTER | DESTINATION |
|---|---|---|---|---|
| 1 | E-mail | 松本 武 | TAKESHI MATSUMOTO | abc@abc.co.jp |
| 2 | FAX | 坂野 豊 | YUTAKA SAKANO | 0120-1234-5678 |
| 3 | SMB | 高橋 千宏 | CHIHIRO TAKAHASHI | 222.44.55.123 |
| 4 | FTP | 菊田 真紀 | MAKI KIKUTA | ftp://100.0.0.789 |
| 5 | SMB | 山花 幸夫 | YUKIO YAMAHANA | |
| 6 | E-mail | 徳永 弘 | HIROSHI TOKUNAGA | def@abc.co.jp |
| 7 | E-mail | 垂井 すみ子 | SUMIKO TARUI | kia@abc.co.jp |
| 8 | FTP | 別所 浩三 | KOZO BESSYO | ftp://100.0.0.456 |
| 9 | E-mail | 西宮 健一 | KENNICHI NISHIMIYA | jkl@abc.co.jp |
| 10 | E-mail | コニカミノルタ | KONICA MINOLTA | konica@minolta.com |
| 11 | FAX | 小田 信岳 | NOBUTAKE ODA | 0120-1234-6666 |
| 12 | E-mail | 中島 貴明 | TAKAAKI NAKAZIMA | mm |
| 13 | E-mail | 坂場 義男 | YOSHIO SAKABA | pro@abc/c |
| 14 | FAX | 山下 信 | MAKOTO YAMASHITA | 0120-1234- |
| 15 | FTP | 山本 道只 | MICHITAKA YAMAMOTO | ftp://100.0.0.123 |
| 16 | E-mail | 堂道 秀樹 | HIDEKI DOUMITI | stu@abc.co.jp |
| 17 | FAX | 堀 雅彦 | MASAHIKO HORI | 0120-1234-9997 |

FIG.20

ID INFORMATION TABLE

| ID | PASSWORD | USE OF MFP | DOMINANT HAND |
|---|---|---|---|
| 12345678 | ABCD | OK | RIGHT |
| 02111478 | A981 | OK | RIGHT |
| 32465784 | A815 | NO | LEFT |
| ... | ... | ... | ... |

DISPLAY SYSTEM PROVIDED WITH FIRST DISPLAY DEVICE AND SECOND DISPLAY DEVICE

This application is based on Japanese Patent Application No. 2011-253779 filed with the Japan Patent Office on Nov. 21, 2011, the entire content of which is hereby incorporated by reference.

BACKGROUND OF THE INVENTION

1. Field of the Invention

The present invention relates to a display system provided with a first display device and a second display device, more particularly to display system provided with a first display device in which screen data is stored and a second display device that displays a screen based on the screen data stored in the first display device.

2. Description of the Related Art

Nowadays, a mobile information terminal becomes sophisticated in functionality, and a person owns the mobile information terminal instead of a PC (Personal Computer). In the mobile information terminal, a digitized document can be freely browsed and edited anywhere. The mobile information terminal is used in various scenes of business and life.

In the display system including an image forming device provided with a main body panel (a manipulation panel) and a mobile information terminal provided with a remote panel, there is a demand for a cooperation between the image forming device and the mobile information terminal as the mobile information terminal becomes further sophisticated in functionality. Specifically, for example, there is the demand to display the same screen as the screen, which is displayed on the main body panel, on the remote panel.

In the case where the same screen as the screen displayed on the main body panel is displayed on the remote panel, conventionally the mobile information terminal acquires image data, which is displayed on the main body panel and stored in a RAM (Random Access Memory) of the image forming device, and displays the same image on the remote panel based on the acquired image data. In the case where a manipulation to change a still screen displayed on the remote panel is accepted from a user, the mobile information terminal acquires post-change screen data from the image forming device in each time.

For example, Document 1 below discloses a technology of displaying a screen of a display source on another terminal. Document 1 discloses a communication device including a storage in which a performance of a device of a transmission source is stored and a moving image generator that generates a moving image by morphing. In the communication device, the number of images generated by the morphing and a data amount of each image are defined according to the performance of a device of a transmission destination. In the communication device, the number of images and the data amount are defined according to a receiving rate of the device of the transmission destination.

[Document 1] Japanese Patent Publication Laying-Open No. 2005-135047

Some mobile information terminals can accept manipulations by gestures such as a flick manipulation. According to this kind of mobile information terminal, the manipulation can be performed more directly and more intuitively. However, in the case where the conventional mobile information terminal accepts the flick manipulation, the image forming device cannot deal with the flick manipulation, and the mobile information terminal cannot display the screen desired by the user. As a result, unfortunately convenience of the user is degraded.

When the screen data of the moving screen associated with the flick manipulation performed at the mobile communication terminal is transmitted from the image forming device to the mobile communication terminal, a communication amount of the data transmitted from the image forming device to the mobile communication terminal increases because of the large size of the screen data, and the moving screen associated with the flick manipulation cannot smoothly be moved on the remote panel of the mobile communication terminal.

As to a method for smoothly moving the moving screen associated with the flick manipulation on the remote panel of the mobile communication terminal, it is conceivable that the communication amount of the data transmitted from the image forming device to the mobile communication terminal is reduced to improve a responsive property by degrading resolution of the screen transmitted from the image forming device. However, in the method, the convenience of the user is degraded because information necessary for the user is also displayed on the remote panel with low resolution.

The problem is generated not only between the image forming device and the mobile information terminal, but also in the display system including the first display device in which the screen data is stored and the second display device that displays the screen based on the screen data stored in the first display device.

SUMMARY OF THE INVENTION

An object of the present invention is to provide a display system that can improve the convenience of the user.

According to one aspect of the present invention, a display system includes: a first display device in which screen data is stored; a second display device for displaying a screen based on the screen data stored in the first display device; a manipulation accepting unit for accepting a flick manipulation to move the screen through the second display device; a first transmitter for transmitting flick information on the flick manipulation accepted by the manipulation accepting unit to the first display device; an area decision unit for deciding an area that is a part on the screen of the second display device, display being changed in the area when the screen is moving; a second transmitter for sequentially transmitting positional information on the area decided by the area decision unit and screen data of a screen in the area decided by the area decision unit from the first display device to the second display device, the screen data of the screen being sequential data before the screen movement is completed since the screen movement is started and being decided based on the flick manipulation; and a first display unit for displaying a screen in the area of the positional information transmitted by the second transmitter using the second display device based on the screen data transmitted by the second transmitter.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a view schematically illustrating screens displayed on a mobile communication terminal 2 and a manipulation panel 130 when mobile communication terminal 2 accepts a flick manipulation (before movement of the screen is started).

FIG. 5 is a view schematically illustrating first screens displayed on mobile communication terminal 2 and manipulation panel 130 before the movement of the screen is completed since the movement is started (the screen is being moved).

FIG. 6 is a view schematically illustrating second screens displayed on mobile communication terminal 2 and manipulation panel 130 before the movement of the screen of is completed since the movement is started (the screen is being moved).

FIG. 11 is a view schematically illustrating the screens, which are displayed on panels B and A while the movement is completed, when panel B accepts the flick manipulation in a second embodiment of the present invention.

FIG. 15 is a view schematically illustrating a movement area in a third embodiment of the present invention.

FIG. 20 is a view schematically illustrating an ID information table used in a second method of detecting the hand that performs the flick manipulation.

DESCRIPTION OF THE PREFERRED EMBODIMENTS

Hereinafter, embodiments of the present invention will be described with reference to the drawings.

Each of display systems of the following embodiments includes a first display device in which screen data is stored and a second display device that displays a screen based on the screen data stored in the first display device. In the descriptions of the following embodiments, an image forming device is the first display device, and a mobile communication terminal that can conduct wired or wireless communication with the image forming device is the second display device.

In the following embodiments, a "flick manipulation" means a manipulation in which a manipulation finger, a manipulation tool, or the like, which touches a touch panel, is slid in any direction while touching the touch panel.

First Embodiment

A configuration of a display system in the present embodiment will be described.

Figure 1:
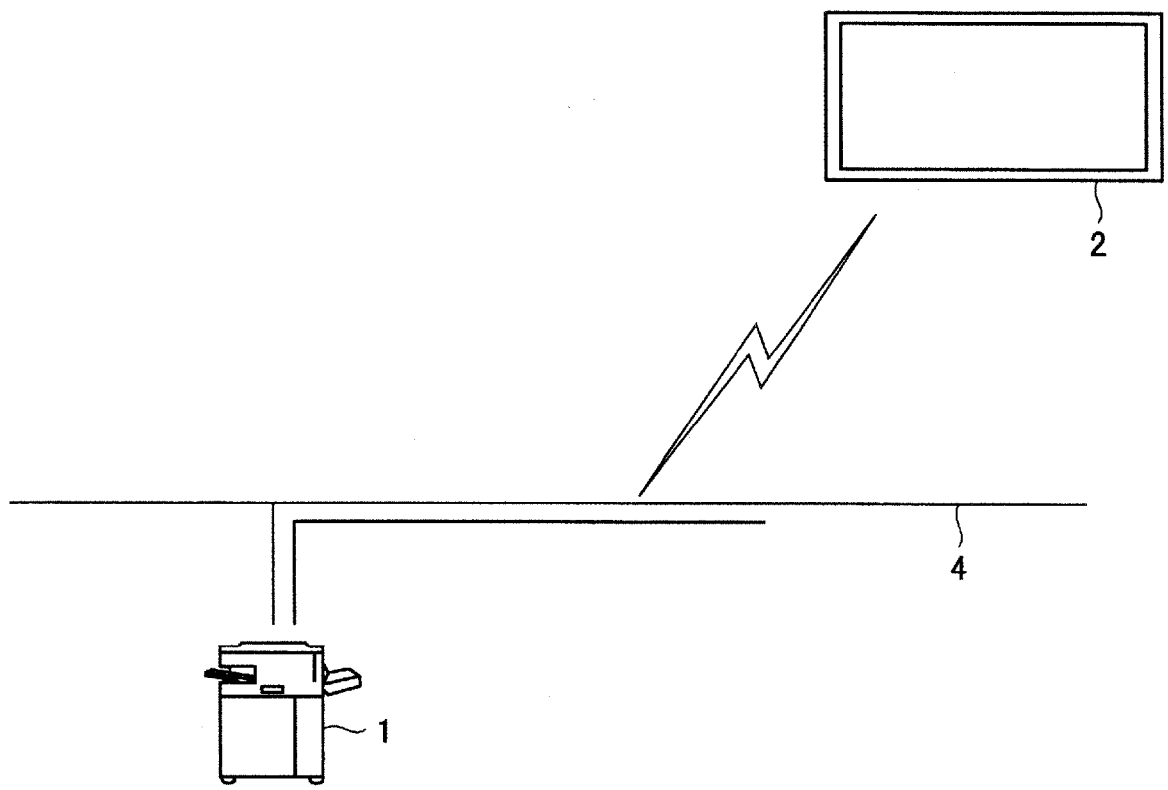
FIG. 1 is a view illustrating schematic configuration of a display system according to a first embodiment of the present invention.

Referring to FIG. 1, the display system includes an image forming device 1 and a mobile communication terminal 2. For example, image forming device 1 is an MFP (Multi Function Peripheral) including a scanner function, a facsimile function, a copying function, a function as a printer, a data communication function, and a server function. Image forming device 1 is connected to an external device (not illustrated) and mobile communication terminal 2 through a network 4.

For example, network 4 is dedicated lines, such as a wired or wireless LAN (Local Area Network). Network 4 connects various devices using a protocol of TCP/IP (Transmission Control Protocol/Internet Protocol). The devices connected to network 4 can transmit and receive various pieces of data to and from each other. A general line or a wireless communication may be used in network 4.

For example, image forming device 1 forms on a sheet a copy image of a scanned manuscript image or an image that is generated based on print data received from the external device or mobile communication terminal 2. For example, the print data means data, in which a printer driver converts a drawing command issued by an operating system or an application program of the external device or mobile communication terminal 2 into a page-description language that can be processed by image forming device 1. The print data may be a document data described in file formats, such as PDF, TIFF, JPEG, and XPS.

Image forming device 1 can transmit the manuscript image to the external device or mobile communication terminal 2 through network 4. Image forming device 1 can store the document data received from the external device or mobile communication terminal 2 in a fixed storage device of image forming device 1.

Mobile communication terminal 2 can transmit and receive data to and from image forming device 1 by wireless communication or wired communication (preferably, the wireless communication). Mobile communication terminal 2 is a mobile computer including a CPU (Central Processing Unit), a RAM, a fixed storage device, a monitor, an LCD (Liquid Crystal Display) panel in which the touch manipulation can be performed.

The display system may have a configuration different from that in FIG. 1. For example, the display system may include an image forming device, which stores the screen data therein while not including a manipulation panel, and a display device that displays a screen by wireless communication based on the screen data stored in the image forming device. For example, in addition to the MFP, the image forming device may be a facsimile machine, a copying machine, or a printer, in which the image is formed by an electrophotographic system or an electrostatic recording system. For example, in addition to the manipulation panel fixed to the image forming device, the first display device may be a manipulation panel, which can conduct wireless communication with the image forming device while being detachably attached to the mobile communication terminal or the image forming device. For example, in addition to the mobile communication terminal, the second display device may be a manipulation panel fixed to the image forming device or a manipulation panel that is detachably attached to the image forming device.

Figure 2:
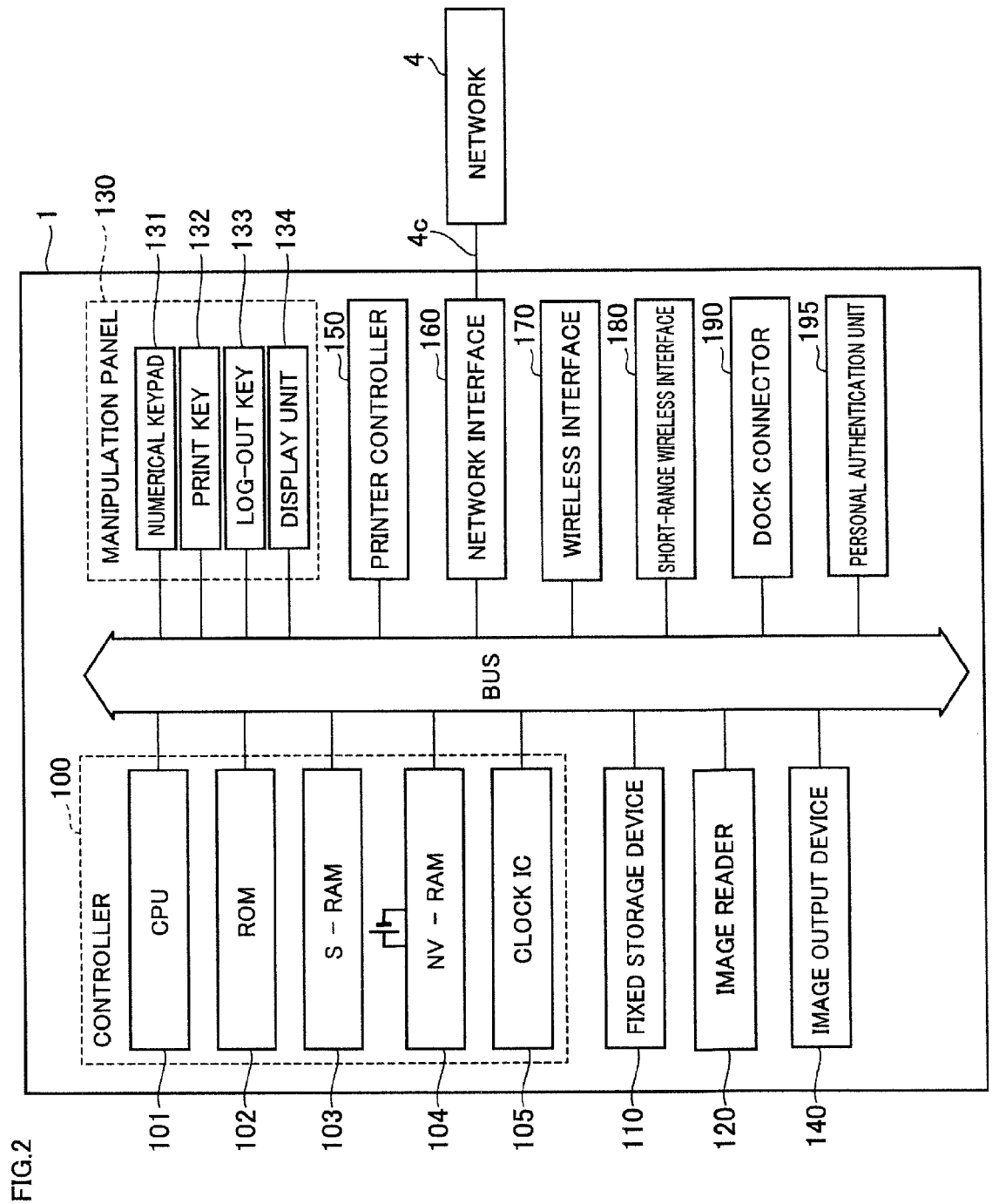
FIG. 2 is a block diagram illustrating an internal configuration of an image forming device 1.

FIG. 2 is a block diagram illustrating an internal configuration of image forming device 1.

Referring to FIG. 2, image forming device 1 includes a CPU 101, a ROM (Read Only Memory) 102, an SRAM (Static Random Access Memory) 103, an NVRAM (Non-Volatile Random Access Memory) 104, a clock IC (Integrated Circuit) 105, a fixed storage device 110, an image reader 120, a manipulation panel 130, an image output device 140, a printer controller 150, a network interface 160, a wireless interface 170, a short-range wireless interface 180, a dock connector 190, and a personal authentication unit 195.

ROM 102, SRAM 103, NVRAM 104, and clock IC 105 are connected to CPU 101 through a bus. CPU 101, ROM 102, SRAM 103, NVRAM 104, and clock IC 105 constitute a controller 100. A control program to control an operation of image forming device 1 is stored in ROM 102. SRAM 103 is a working memory for CPU 101. Various settings related to the image formation are stored in NVRAM 104 by battery backup.

Fixed storage device 110, image reader 120, manipulation panel 130, image output device 140, printer controller 150, network interface 160, and wireless interface 170 are connected to controller 100 through a bus. For example, fixed storage device 110 is a hard disk drive, in which the screen data of the screen displayed on manipulation panel 130 and mobile communication terminal 2 are stored. Image reader 120 reads the manuscript image. Manipulation panel 130 includes a numerical keypad 131 that is used to input a numeric character, a print key 132 that accepts an instruction to perform the printing, a log-out key 133 that accepts a log-out instruction from a user, and a display unit 134 that displays various pieces of information. Because manipulation panel 130 includes display unit 134, image forming device 1 is a kind of display device. Image output device 140 forms the copy image on the sheet. Printer controller 150 generates the copy image from print data received by network interface 160. Network interface 160 connects image forming device 1 to network 4 through a network cable 4c. Network interface 160 transmits and receives various pieces of information to and from the external device or mobile communication terminal 2. Wireless interface 170 conducts wireless communication with the external device or mobile communication terminal 2.

Short-range wireless interface 180, dock connector 190, and personal authentication unit 195 are connected to controller 100 through the bus. For example, short-range wireless interface 180 is Bluetooth (registered trademark) or IrDA (registered trademark), which is mainly used to conduct communication with mobile communication terminal 2. Mobile communication terminal 2 is attached to dock connector 190. Image forming device 1 transmits and receives various pieces of data to and from mobile communication terminal 2 through dock connector 190. For example, personal authentication unit 195 performs processing of authenticating a user who uses image forming device 1 by accepting an ID and a password.

Figure 3:
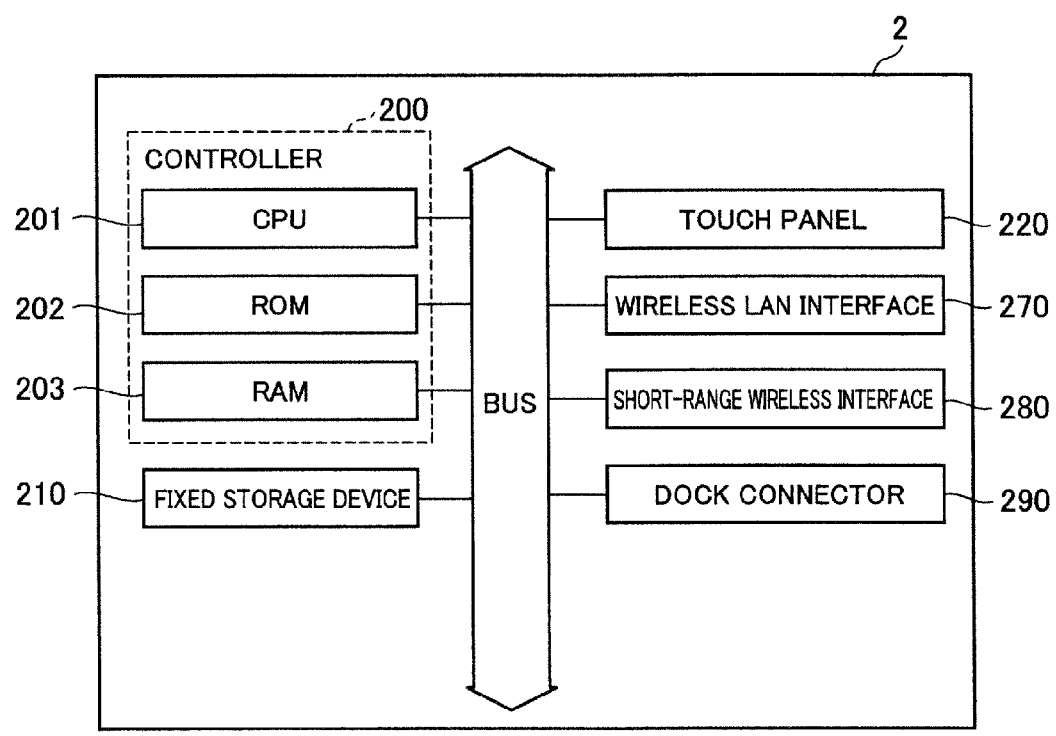
FIG. 3 is a block diagram illustrating an internal configuration of a mobile communication terminal 2.

FIG. 3 is a block diagram illustrating an internal configuration of mobile communication terminal 2.

Referring to FIG. 3, mobile communication terminal 2 (a remote manipulation panel and a remote panel) includes a CPU 201, a ROM 202, a RAM 203, a fixed storage device 210, a touch panel 220, wireless LAN interface 270, a short-range wireless interface 280, and a dock connector 290. ROM 202 and RAM 203 are connected to CPU 201 through a bus. CPU 201, ROM 202, and RAM 203 constitute a controller 200. A control program to control an operation of mobile communication terminal 2 is stored in ROM 202. SRAM 203 is a working memory for CPU 201.

Fixed storage device 210, touch panel 220, wireless LAN interface 270, short-range wireless interface 280, and dock connector 290 are connected to controller 200 through a bus. For example, fixed storage device 210 is a hard disk drive, in which various pieces of information are stored. Touch panel 220 displays various pieces of information, and accepts a manipulation input of the user who directly touches the screen. Wireless LAN interface 270 conducts wireless communication with image forming device 1. For example, short-range wireless interface 280 is Bluetooth (registered trademark) or IrDA (registered trademark), which is mainly used to conduct communication with image forming device 1. Dock connector 290 is used in putting mobile communication terminal 2 on image forming device 1. Mobile communication terminal 2 transmits and receives various pieces of data to and from image forming device 1 through dock connector 290.

For example, mobile communication terminal 2 is connected to image forming device 1 by a wired manner to be able to conduct communication with image forming device 1 when dock connector 2 is put on dock connector 190 of image forming device 1. When existing in a range where mobile communication terminal 2 can conduct wireless communication with image forming device 1 through short-range wireless interfaces 180 and 280, mobile communication terminal 2 is connected to image forming device 1 in the wireless manner to be able to conduct communication with image forming device 1.

An operation of the display system in the case where mobile communication terminal 2 accepts the flick manipulation (the flick manipulation on the display device terminal) will be described below.

When being able to conduct communication with image forming device 1, mobile communication terminal 2 displays the substantially same screen (a display content of manipulation panel 130) as the screen displayed on manipulation panel 130. In other words, the screen displayed on manipulation panel 130 is also displayed on mobile communication terminal 2, and mobile communication terminal 2 accepts the manipulation from the user. When displaying the screen corresponding to the screen displayed on manipulation panel 130, mobile communication terminal 2 acquires the screen data, which is stored in fixed storage device 110 and displayed on manipulation panel 130, and displays the screen data on touch panel 220. When the display screen of mobile communication terminal 2 changes, mobile communication terminal 2 acquires the screen data from image forming device 1.

FIGS. 4 to 6 are views schematically illustrating the screens displayed on mobile communication terminal 2 and manipulation panel 130 when mobile communication terminal 2 accepts the flick manipulation. In FIGS. 4 to 6, (a) illustrates the screen displayed on mobile communication terminal 2, and (b) illustrates the screen displayed on manipulation panel 130. FIG. 4 illustrates the screens displayed on mobile communication terminal 2 and manipulation panel 130 when mobile communication terminal 2 accepts the flick manipulation (before the movement of the screen is started). FIGS. 5 and 6 illustrate the screens displayed on mobile communication terminal 2 and manipulation panel 130 before the movement of the screen of is completed since the movement is started (the screen is currently moved). FIGS. 4 to 6 illustrate a still screen.

Referring to FIG. 4(a), mobile communication terminal 2 displays a destination table stored in fixed storage device 110. A plurality of pieces of information on destinations are displayed in the destination table. A registration number, a transmission type, a name (destination name), a roman character (of the destination name), and a destination (transmission address) for one transmission destination are described in a horizontal direction (row direction) of an address book. The destination names are arrayed in Japanese alphabetical order in a vertical direction (column direction) of the address book. Scroll bars SB1 and SB2 are provided on the right side and lower side of the destination table. In the case where the user moves scroll bar SB1 or SB2, manipulation panel 130 moves (scrolls) the screen of the destination table along movement direction of scroll bar SB1 or SB2.

For example, in the case where the screen displayed on mobile communication terminal 2 is moved in an upward direction in FIG. 4(a), the user who uses mobile communication terminal 2 performs the flick manipulation on touch panel 220 so as to move the manipulation portion (the manipulation finger or the manipulation tool) in the upward direction in FIG. 4(a) from a position PO1 to a position PO2 along a dotted line in FIG. 4(a). When accepting the flick manipulation, mobile communication terminal 2 transmits flick information on the flick manipulation to image forming device 1.

Preferably the flick information transmitted to image forming device 1 by mobile communication terminal 2 includes a contact position of the manipulation portion with mobile communication terminal 2 during the flick manipulation, the movement direction of the manipulation portion on mobile communication terminal 2 during the flick manipulation, a position where the manipulation portion is separated from mobile communication terminal 2 during the flick manipulation, and a contact time of the manipulation portion with mobile communication terminal 2 during the flick manipulation.

When receiving the flick information, image forming device 1 decides an area REG1 (an area surrounded by a bold line) as an area (hereinafter sometimes referred to as a movement area), which is part of an area on the screen of mobile communication terminal 2 and where the display is changed during the movement of the screen. Based on the received flick information, image forming device 1 transmits positional information (a coordinate in the movement area on the screen of mobile communication terminal 2) on the movement area to mobile communication terminal 2. Image forming device 1 sequentially transmits the pieces of screen data of the screens in the movement area until the movement is completed since the movement is started, namely, the pieces of screen data in area REG1 in FIGS. 5(a) and 6(a) to mobile communication terminal 2.

In the case where important information is included in the screen displayed on mobile communication terminal 2, image forming device 1 decides the area (for example, a name field in the destination table), where the important information is displayed, as the movement area. The important information means important information included in the screen data. The moving screen of the area that the user wants to see can be displayed by deciding the area, where the important information is displayed, as the movement area. Preferably the important information of the screen data is recorded in the screen data. For example, as illustrated in FIG. 4(a), in the case where the flick manipulation is accepted while the screen displayed on mobile communication terminal 2 is the destination table, preferably area REG1 where the name of the destination table is described is decided as the movement area.

Mobile communication terminal 2 sequentially displays the screens in FIGS. 5(a) and 6(a) based on the screen data received from image forming device 1. In FIGS. 5(a) and 6(a), the area except area REG1 remains in the state in which the flick manipulation is started (the screen that is displayed before the flick manipulation is accepted). As a result, mobile communication terminal 2 moves the screen in which only area REG1 is moved in the upward direction in FIG. 4(a) as the moving screen.

Referring to FIG. 4(b), in the case where image forming device 1 receives the flick information while mobile communication terminal 2 displays the screen corresponding to the screen displayed on manipulation panel 130, manipulation panel 130 sequentially displays the screens in FIGS. 5(a) and 6(b) that are the pieces of screen data of the screens until the movement is completed since the movement is started based on the received flick information. The screen that is displayed while manipulation panel 130 is moving, as illustrated in FIGS. 5(b) and 6(b), differs from the screen that is displayed while manipulation panel 130 is moving as illustrated in FIGS. 5(a) and 6(a) in that not only the movement area but also the whole screen move in the upward direction in FIG. 5(b).

As described above, in the display system, when the flick manipulation is performed on mobile communication terminal 2, image forming device 1 continuously transmits the screen data of the partial area to mobile communication terminal 2, and only the information necessary for the user is displayed on mobile communication terminal 2. Therefore, the display range is restricted in the case where mobile communication terminal 2 accepts an instruction related to the display screen and displays the screen corresponding to the screen displayed on manipulation panel 130. As a result, a communication amount between image forming device 1 and mobile communication terminal 2 can be reduced.

Figure 7:
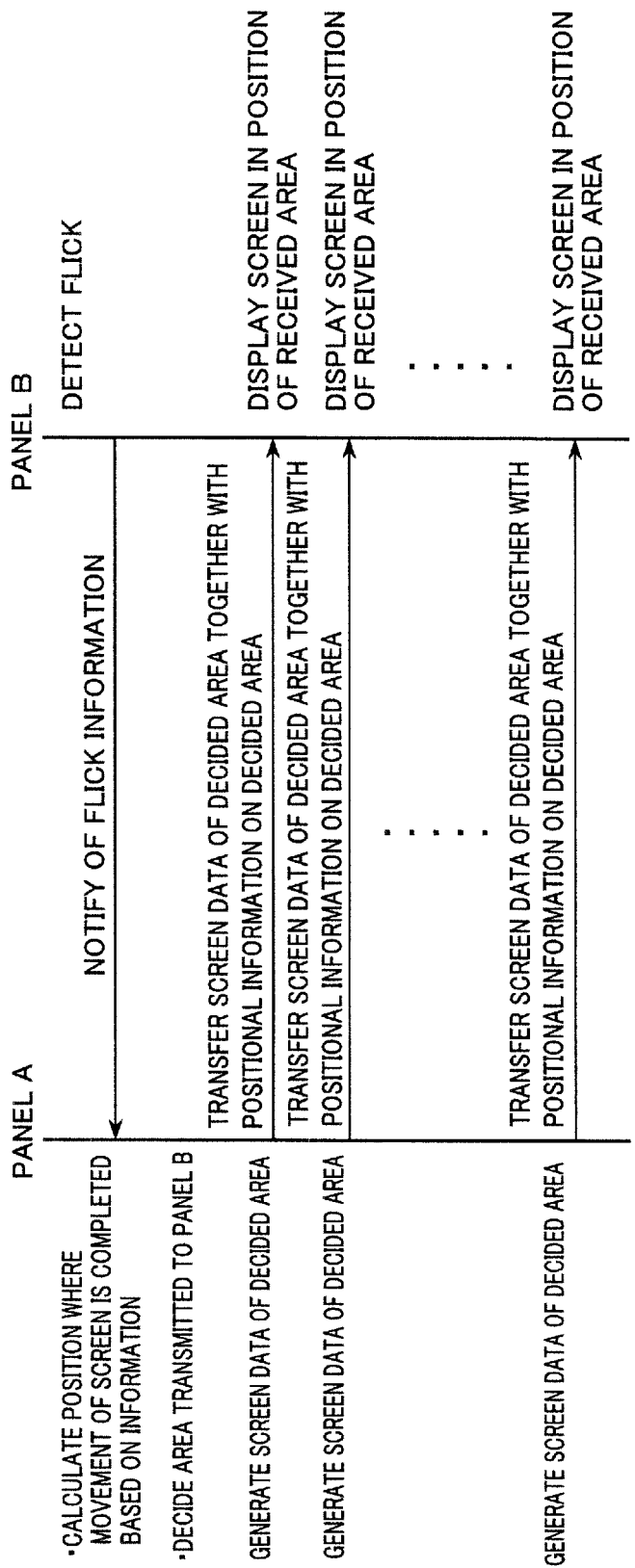
FIG. 7 is a sequence diagram illustrating an example of communication conducted between a panel A and a panel B in the first embodiment of the present invention.

FIG. 7 is a sequence diagram illustrating an example of communication conducted between panels A and B in the first embodiment of the present invention. Hereinafter, sometimes the first display device (image forming device 1 and the display device of the display source) is referred to as a panel A and the second display device (mobile communication terminal 2 and the display device of the display destination) is referred to as a panel B.

Referring to FIG. 7, panel B notifies panel A of the flick information when detecting the flick manipulation on panel B. Based on the received flick information, panel A calculates a position where the movement of the screen is completed (a final position of the screen movement). Then panel A decides the movement area (the area transmitted to panel B). Then panel A generates the screen data of the movement area (the decided area) in each screen before the movement is completed since the movement is started, and continuously transfers the screen data of the movement area to panel B together with the positional information on the movement area. Every time panel B receives the screen data of one screen, panel B displays the screen data in the movement area (the position of the received area).

Figure 8:
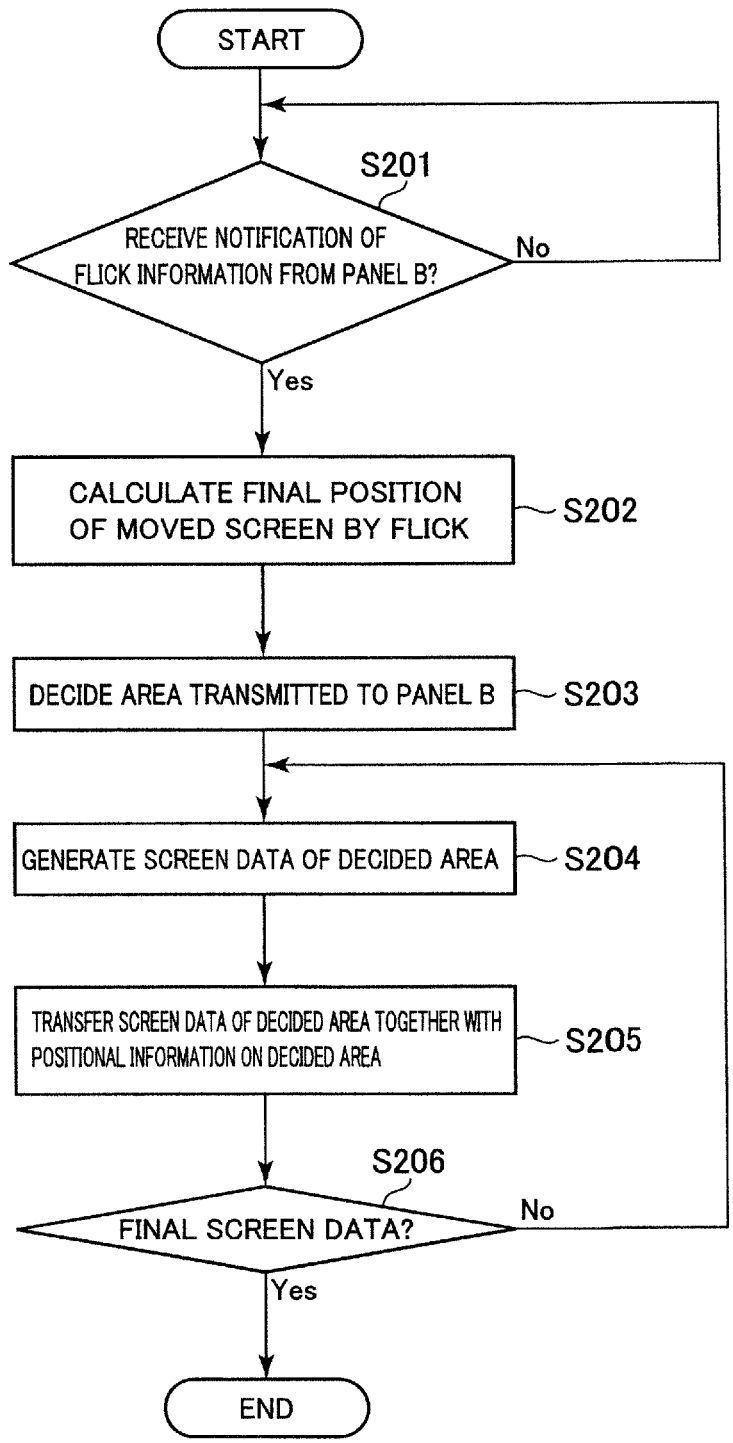
FIG. 8 is a flowchart illustrating an operation of the panel A when the flick manipulation is accepted on the panel B in the first embodiment of the present invention.

FIG. 8 is a flowchart illustrating an operation of panel A when the flick manipulation is accepted on panel B in the first embodiment of the present invention.

Referring to FIG. 8, CPU 101 of panel A determines whether panel B notifies panel A of the flick information including an input position (the contact position of the manipulation portion) (S201). In step S201, when panel B notifies panel A of the flick information (Yes in S201), CPU 101 calculates the final position of the screen moved by the flick manipulation based on the flick information (S202), and goes to processing in S203. On the other hand, in step S201, when panel B does not notify panel A of the flick information (No in S201), CPU 101 performs the processing in S201 again.

In step S203, CPU 101 decides the movement area (the area transmitted to panel B, the restricted area, and the decided area) (S203). CPU 101 generates the pieces of screen data until the movement of the movement area is completed since the movement is started based on the received flick information (S204), and transmits to panel B the positional information on the movement area and the pieces of screen data of the screens until the movement of the movement area is completed since the movement is started (S205). CPU 101 determines whether the screen data (final screen data) of the screen in which the movement is completed is transmitted (S206).

In step S206, when the screen data of the screen in which the movement is completed is transmitted (Yes in S206), CPU 101 ends the processing. On the other hand, in step S206, when the screen data of the screen in which the movement is completed is not transmitted (No in S206), CPU 101 goes to processing in S204 to generate the screen data of the next screen (S204).

Figure 9:
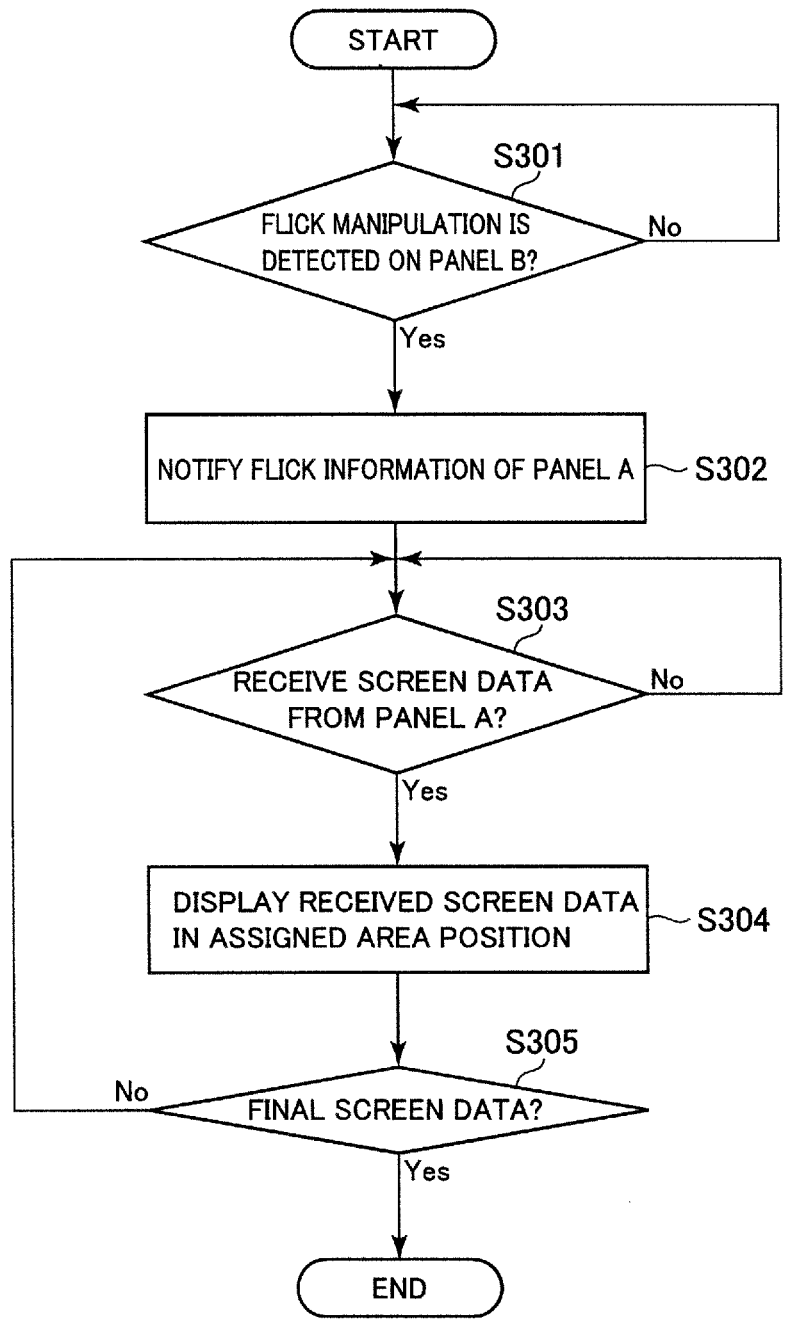
FIG. 9 is a flowchart illustrating an operation of the panel B when the flick manipulation is accepted on the panel B in the first embodiment of the present invention.

FIG. 9 is a flowchart illustrating an operation of panel B when the flick manipulation is accepted on panel B in the first embodiment of the present invention.

Referring to FIG. 9, CPU 201 of panel B determines whether the flick manipulation is detected on panel B (S301). In step S301, when the flick manipulation is detected (Yes in S301), CPU 201 notifies panel A of the flick information including the input position (S302), and goes to processing in S303. On the other hand, in step S301, when the flick manipulation is not detected (No in S301), CPU 101 performs the processing in S301 again.

In step S303, CPU 201 determines whether the positional information and the screen data of the movement area are received from panel A (S303). In step S303, when it is determined that the positional information and the screen data of the movement area are received (Yes in S303), CPU 201 displays the received screen data in the movement area (an assigned area position) on panel B (S304), and CPU 201 goes to processing in S305. On the other hand, in step S303, when the positional information and the screen data of the movement area are not received (No in S303), CPU 101 performs the processing in S303 again.

In step S305, CPU 201 determines whether the screen data (the final screen data) of the screen in which the movement is completed is received (S305). In step S306, when it is determined that the screen data of the screen in which the movement is completed is received (Yes in S305), CPU 201 ends the processing. On the other hand, in step S305, when the screen data of the screen in which the movement is completed is not received (No in S305), CPU 201 goes to the processing in S303 to determine whether the screen data of the next screen is received from panel A (S303).

When viewing the screen displayed on display devices, such as panels A and B, the user views only the information in a part of the screen and performs a search and a determination (the manipulation) based on only the information in the part of the screen. For example, in the case where the display device displays the destination table, usually the user views only the name (of the transmission destination) when searching the destination. In other words, the registration number, the roman character, and the transmission address except the name are not necessary information when the user performs the operation to search the destination. In the case where the screen associated with the flick manipulation is displayed on panel B, the reason the communication amount increases between panels A and B is that information except the necessary information is displayed for the user.

According to the present embodiment, the display system that improves convenience of the user can be provided.

According to the present embodiment, in the case where the flick manipulation is accepted, the communication amount between panels A and B can be reduced by restricting the area displayed during the movement. Therefore, the (smooth or natural) flick manipulation can be implemented on panel B without providing a feeling of strangeness, and the convenience of the user can be improved.

Even if the user performs the flick manipulation in any position, the necessary information can be provided to the user by deciding the area where the important information is displayed as the movement area.

A method except the above method for deciding the important information as the movement area may be adopted as the movement area deciding method. For example, panel A may decide the movement area based on the flick information (for example, the contact position of the manipulation portion with panel B during the flick manipulation), or previously decide the movement area on the display screen of panel B based on the setting accepted from the user.

Figure 10:
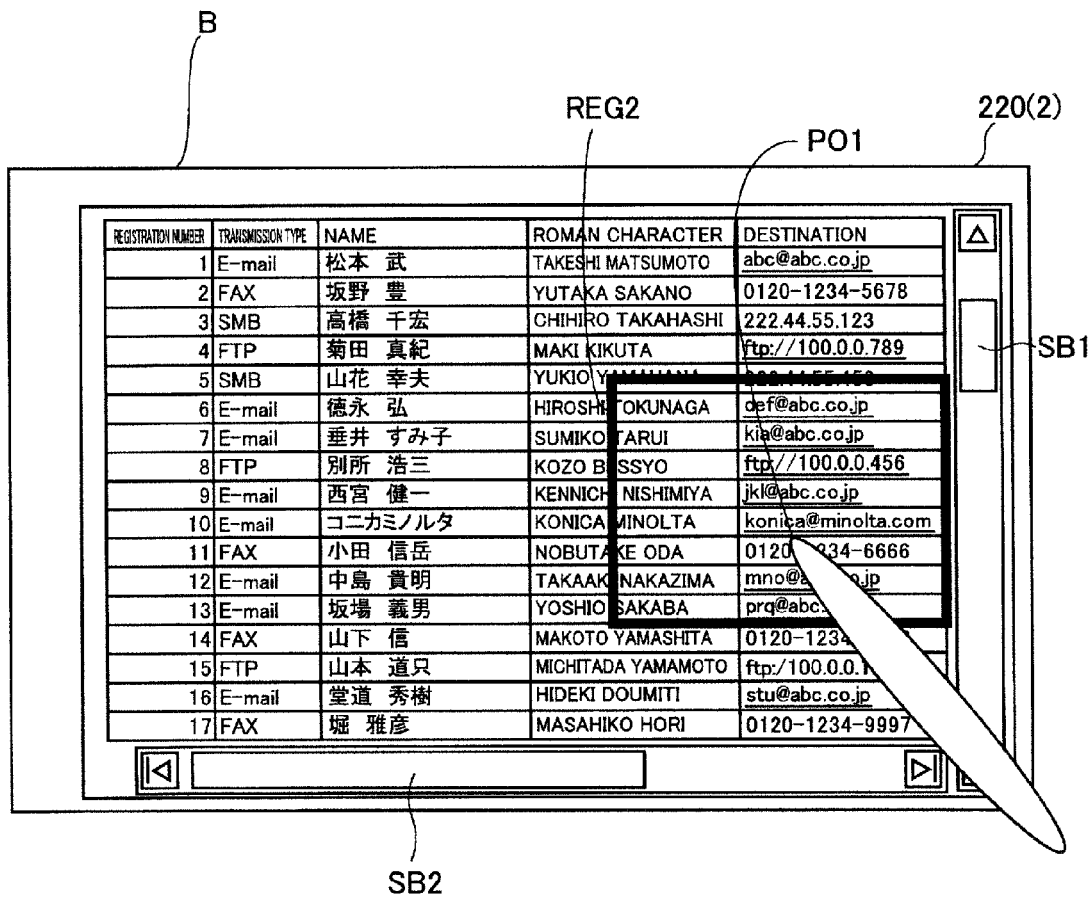
FIG. 10 is a view illustrating an example of a movement area decided based on flick information.

FIG. 10 is a view illustrating an example of the movement area decided based on the flick information.

Referring to FIG. 10, for example, panel A may decide position PO1, which is the contact position of the manipulation portion with panel B during the flick manipulation, and an area REG2 (an area surrounded by a bold line) around position PO1 as the movement area. In this case, panel A transmits the screen data of area REG2 to panel B, and panel B changes only the screen of area REG2 when the screen is moving. Generally the user tends to perform the flick manipulation to the neighborhood of the range that the user wants to see, so that the moving screen of the area that the user wants to see can be displayed by deciding area REG2 as the movement area. Panel B may decide the movement area based on the flick manipulation and transmit the positional information on the decided movement area to panel A.

Second Embodiment

FIG. 11 is a view schematically illustrating the screens, which are displayed on panels B and A while the movement is completed, when panel B accepts the flick manipulation in a second embodiment of the present invention. In FIG. 11, (a) illustrates the screen displayed on panel B, and (b) illustrates the screen displayed on panel A.

Referring to FIG. 11, in the present embodiment, panel A transmits to panel B the screen data, which is accepted by panel B as the screen data of the screen in which the movement is completed, and displayed in a movable area by the flick manipulation (the area that can move by the flick manipulation). The movable area by the flick manipulation corresponds to an area REG3 (an area surrounded by a bold line) that is the movable area by scroll bars SB1 and SB2. For example, in the case where panel B displays the destination table in FIGS. 4 to 6, panel A transmits the screen data displayed in area REG3 to panel B. As a result, the screen (see FIG. 11(a)) that is displayed on panel B when the movement is completed becomes identical to the screen (see FIG. 11(b)) that is displayed on panel A when the movement is completed. The area except area REG3 in the display screen of panel B is a non-movable area that does not move by scroll bars SB1 and SB2 or the flick manipulation.

Panel A may transmit the screen data of the whole screen including area REG3 and the non-movable area in the display screen of panel B as the screen data of the screen in which the movement is completed. In this case, the screen (see FIG. 11A) that is displayed on panel B when the movement is completed also becomes identical to the screen (see FIG. 11B) that is displayed on panel A when the movement is completed.

Figure 12:
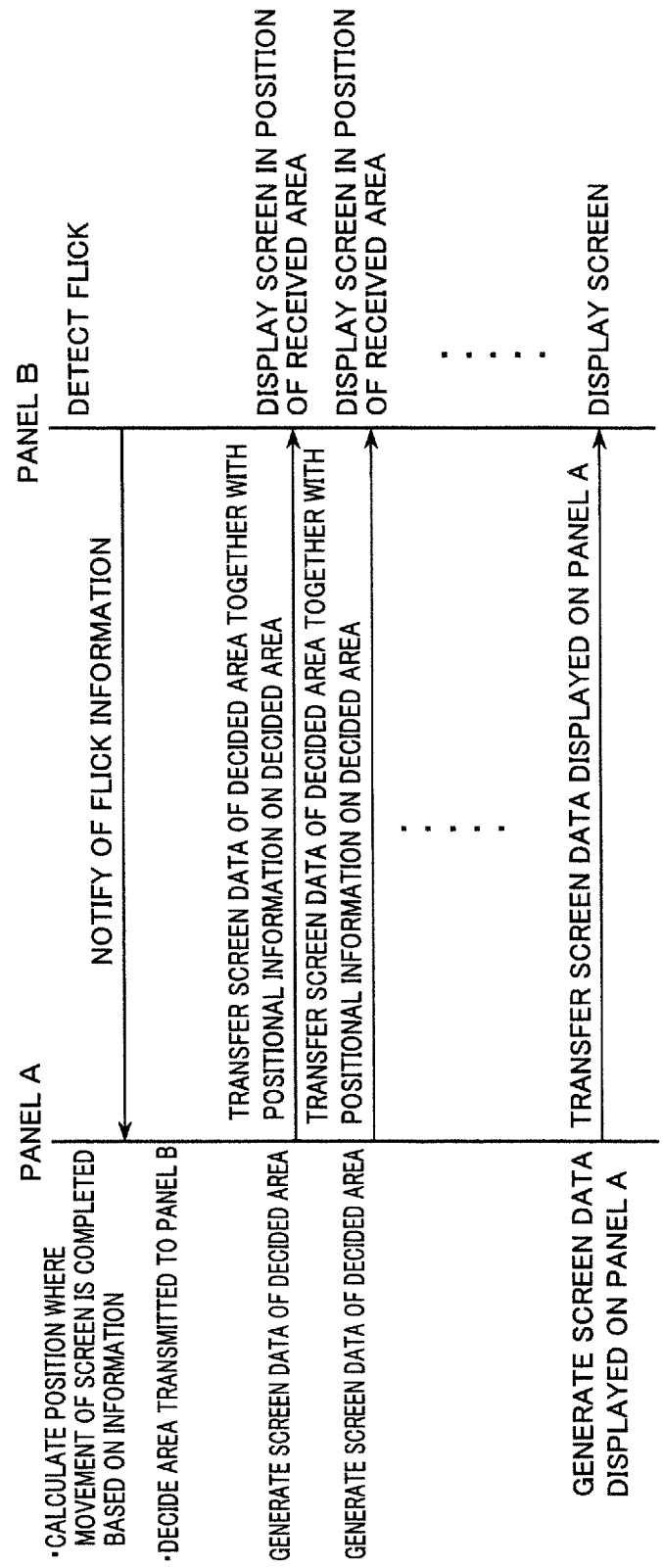
FIG. 12 is a sequence diagram illustrating an example of the communication conducted between the panel A and the panel B in the second embodiment of the present invention.

FIG. 12 is a sequence diagram illustrating an example of the communication conducted between panels A and B in the second embodiment of the present invention.

Referring to FIG. 12, panel B notifies panel A of the flick information when detecting the flick manipulation on panel B. Based on the received flick information, panel A calculates the position where the movement of the screen is completed (the final position of the screen movement). Then panel A decides the movement area (the area transmitted to panel B). Then panel A generates the screen data of the movement area (the decided area) in each screen before the movement is completed since the movement is started, and continuously transfers the screen data of the movement area to panel B together with the positional information on the movement area. Panel A generates the screen data (the screen data displayed on panel A) of the whole movable area by the flick manipulation, which is accepted by panel B as the screen data of the screen in which the movement is completed, based on the flick information, and transmits the screen data to panel B. Panel B displays the screen data every time panel B receives the screen data of one screen.

Figure 13:
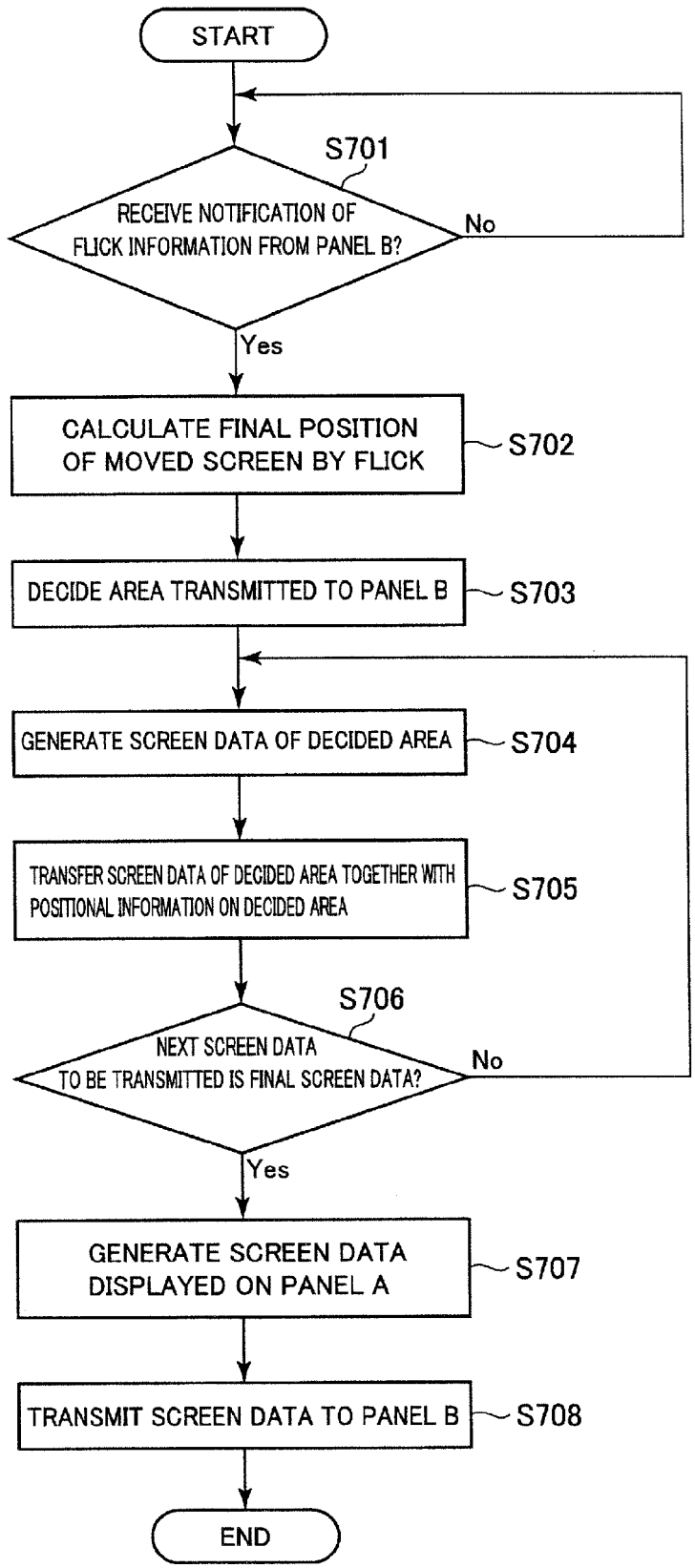
FIG. 13 is a flowchart illustrating an operation of the panel A when the flick manipulation is accepted on the panel B in the second embodiment of the present invention.

FIG. 13 is a flowchart illustrating an operation of panel A when the flick manipulation is accepted on panel B in the second embodiment of the present invention.

Referring to FIG. 13, pieces of processing in S701 to S705 identical to the pieces of processing in S201 to S205 of the flowchart in FIG. 8 are performed.

After the processing in S705, CPU 101 determines whether the next screen data to be transmitted (generated) is the screen data (the final screen data) of the screen in which the movement is completed (S706).

In step S706, When it is determined that the next screen data is the screen data of the screen in which the movement is completed (Yes in S706), CPU 101 generates the screen data (the screen data displayed on panel A, and the normal screen data) of the whole movable area by the flick manipulation, which is accepted by panel B as the screen data of the screen in which the movement is completed (S707), CPU 101 transmits the screen data to panel B (S708), and ends the processing. On the other hand, in step S706, when it is determined that the next screen data is not the screen data of the screen in which the movement is completed (No in S706), CPU 101 goes to the processing in S704 to generate the screen data, which is the screen data of the next screen and the screen data in the movement area, based on the screen data stored in fixed storage device 110.

Figure 14:
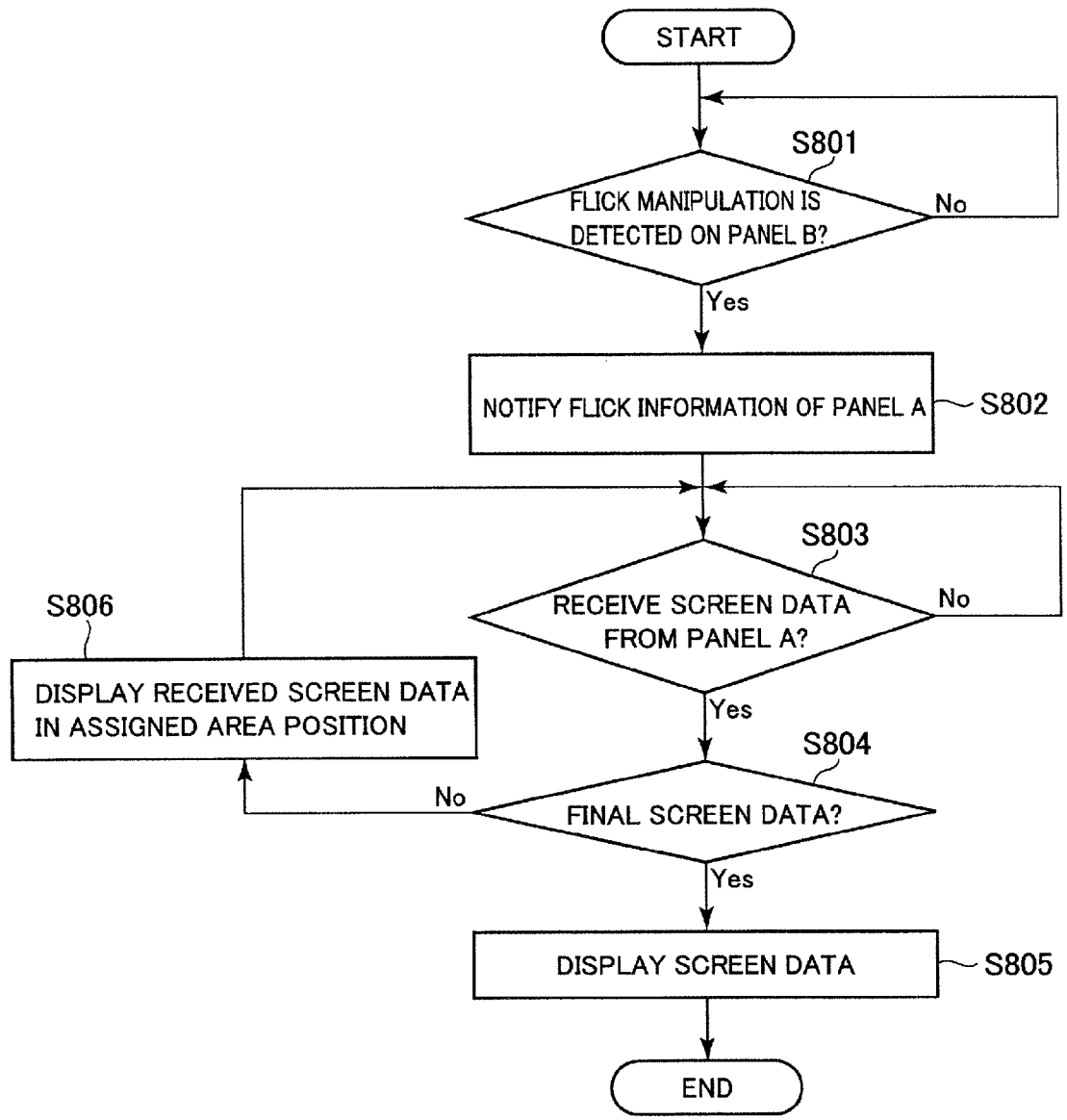
FIG. 14 is a flowchart illustrating an operation of the panel B when the flick manipulation is accepted on the panel B in the second embodiment of the present invention.

FIG. 14 is a flowchart illustrating an operation of panel B when the flick manipulation is accepted on panel B in the second embodiment of the present invention.

Referring to FIG. 14, pieces of processing in S801 to S803 identical to the pieces of processing in S301 to S303 of the flowchart of the first embodiment in FIG. 9 are performed.

After the processing in S803, CPU 201 determines whether the screen data received from panel A is the screen data (the final screen data) of the screen in which the movement is completed (S804). When the screen data is the screen data of the screen in which the movement is completed (Yes in S804), CPU 201 directly displays the received screen data on panel B (S805), and ends the processing. On the other hand, in step S804, when it is determined that the screen data is not the screen data of the screen in which the movement is completed (No in S804), CPU 201 displays the received screen data in the movement area (the assigned area position) on panel B (S806), and goes to the processing in S803.

In the present embodiment, other operations of panels A and B and the configuration of the display system are identical those of the first embodiment, the overlapping description is omitted.

In the state in which only the screen data of the movement area is transmitted from panel A as the pieces of screen data before the movement is completed since the movement is started, the movement area on the display screen of panel B is not matched with other areas, but only the partial area on the display screen of panel B is matched with the display screen of panel A. According to the present embodiment, panel A transmits to panel B the screen data of the whole movable area or the whole display screen of panel A as the finally-transmitted screen data. Therefore, when the movement by the flick manipulation is completed, the display screen of panel B is matched and synchronized with the display screen of panel A. As a result, the screen that is easily viewed by the user can be provided.

Third Embodiment

In the present embodiment, a first modification of the movement area deciding method based on the flick information will be described.

FIG. 15 is a view schematically illustrating a movement area in a third embodiment of the present invention.

Referring to FIG. 15, it is assumed that panel B accepts the flick manipulation to move the manipulation portion from position PO1 that is the contact position of the manipulation portion with panel B toward a direction (a downward direction in FIG. 15) indicated by an arrow AR1, and that panel A accepts the flick information on the flick manipulation. In this case, the screen displayed on panel B moves in the downward direction in FIG. 15. Panel A decides an area REG4 (an area surrounded by a bold line), where area REG2 (a dotted-line rectangular area around position PO1) that is the normal movement area is enlarged (extends) from position PO1 in the manipulation portion moving direction indicated by an arrow AR1 as the movement area.

Figure 16:
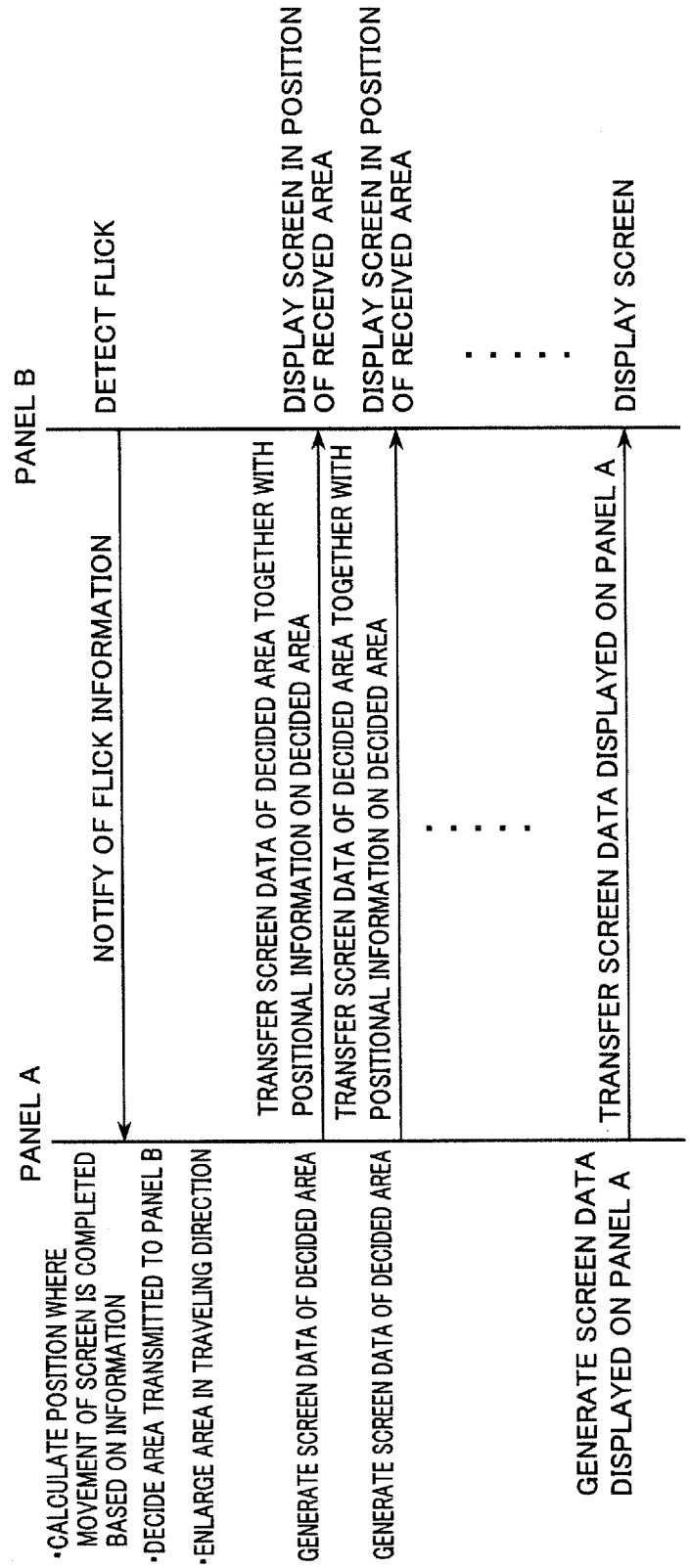
FIG. 16 is a sequence diagram illustrating an example of the communication conducted between the panel A and the panel B in the third embodiment of the present invention.

FIG. 16 is a sequence diagram illustrating an example of the communication conducted between panels A and B in the third embodiment of the present invention.

Referring to FIG. 16, panel B notifies panel A of the flick information when detecting the flick manipulation on panel B. Based on the received flick information, panel A calculates the position where the movement of the screen is completed (the final position of the screen movement). Then panel A decides the area, where the normal movement area is enlarged in the manipulation portion moving direction (traveling direction), as the movement area. Then panel A generates the screen data of the movement area (the decided area) in each screen before the movement is completed since the movement is started, and continuously transfers the screen data of the movement area to panel B together with the positional information on the movement area. Panel A generates the screen data (the screen data displayed on panel A) of the whole movable area by the flick manipulation, which is accepted by panel B as the screen data of the screen in which the movement is completed, based on the flick information, and transmits the screen data to panel B. Panel B displays the screen data every time panel B receives the screen data of one screen.

In the case where the flick information received by panel A does not include the manipulation portion moving direction on panel B during the flick manipulation, panel A may determine the manipulation portion moving direction (traveling direction) on panel B during the flick manipulation based on the contact position of the manipulation portion with panel B during the flick manipulation and the position where the manipulation portion is separated from panel B during the flick manipulation.

Figure 17:
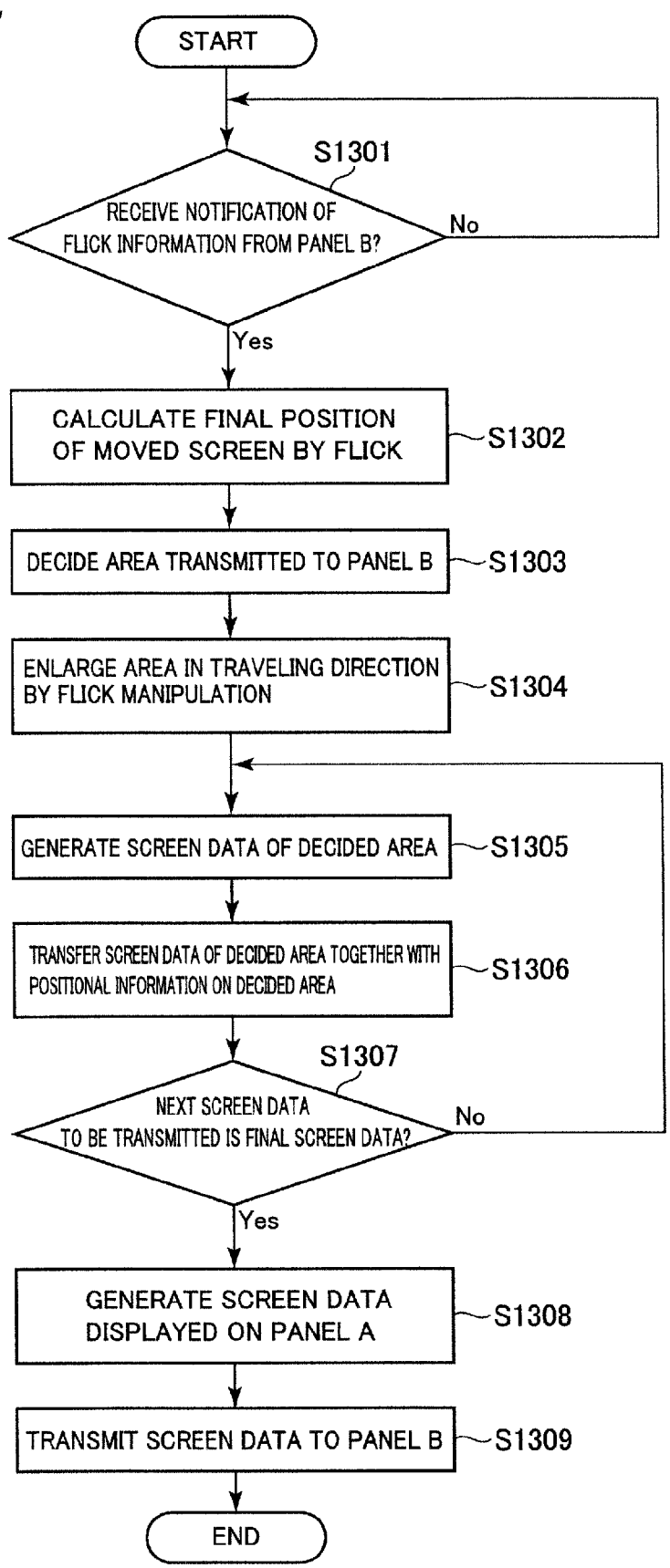
FIG. 17 is a flowchart illustrating an operation of the panel A when the flick manipulation is accepted on the panel B in the third embodiment of the present invention.

FIG. 17 is a flowchart illustrating an operation of panel A when the flick manipulation is received on panel B in the third embodiment of the present invention.

Referring to FIG. 17, CPU 101 of panel A determines whether panel B notifies panel A of the flick information (S1301). In step S1301, when it is determined that panel B notifies panel A of the flick information (No in S1301), CPU 101 calculates the final position of the screen moved by the flick manipulation based on the flick information (S1302), and goes to processing in S1303. On the other hand, in step S1301, when it is determined that panel B does not notify panel A of the flick information (No in S1301), CPU 101 performs the processing in S1301 again.

In step S1303, CPU 101 decides the normal movement area (the area transmitted to panel B) based on the flick information (S1303). CPU 101 decides the area, where the normal movement area is enlarged in the manipulation portion moving direction (traveling direction by the flick manipulation) in the flick manipulation, as the movement area (S1304). CPU 101 generates the pieces of screen data until the movement of the movement area is completed since the movement is started based on the received flick information (S1305), and transmits to panel B the positional information on the movement area and the pieces of screen data of the screens until the movement of the movement area is completed since the movement is started (S1306). Then CPU 101 determines whether the next screen data to be transmitted (generated) is the screen data (the final screen data) of the screen in which the movement is completed (S1307).

In step S1307, when it is determined that the next screen data is the screen data of the screen in which the movement is completed (Yes in S1307), CPU 101 generates the screen data (the screen data displayed on panel A, and the normal screen data) of the whole movable area by the flick manipulation, which is accepted by panel B as the screen data of the screen in which the movement is completed (S1308), CPU 101 transmits the screen data to panel B (S1309), and ends the processing. On the other hand, in step S1307, when it is determined that the next screen data is not the screen data of the screen in which the movement is completed (No in S1307), CPU 101 goes to the processing in S1305 to generate the screen data, which is the screen data of the next screen and the screen data in the movement area, based on the screen data stored in fixed storage device 110 (1305).

In the present embodiment, other operations of panels A and B and the configuration of the display system are identical those of the first embodiment, the overlapping description is omitted.

According to the present embodiment, the area where the normal movement area is enlarged on the screen moving direction side is decided as the movement area to expand the range that is viewed in the screen moving direction by the user. There is a high possibility that the area that the user wants to refer to exists in the screen moving direction by the flick manipulation. Therefore, the screen that is easily viewed by the user can be provided.

Fourth Embodiment

In the present embodiment, a second modification of the movement area deciding method based on the flick information will be described.

Figure 18:
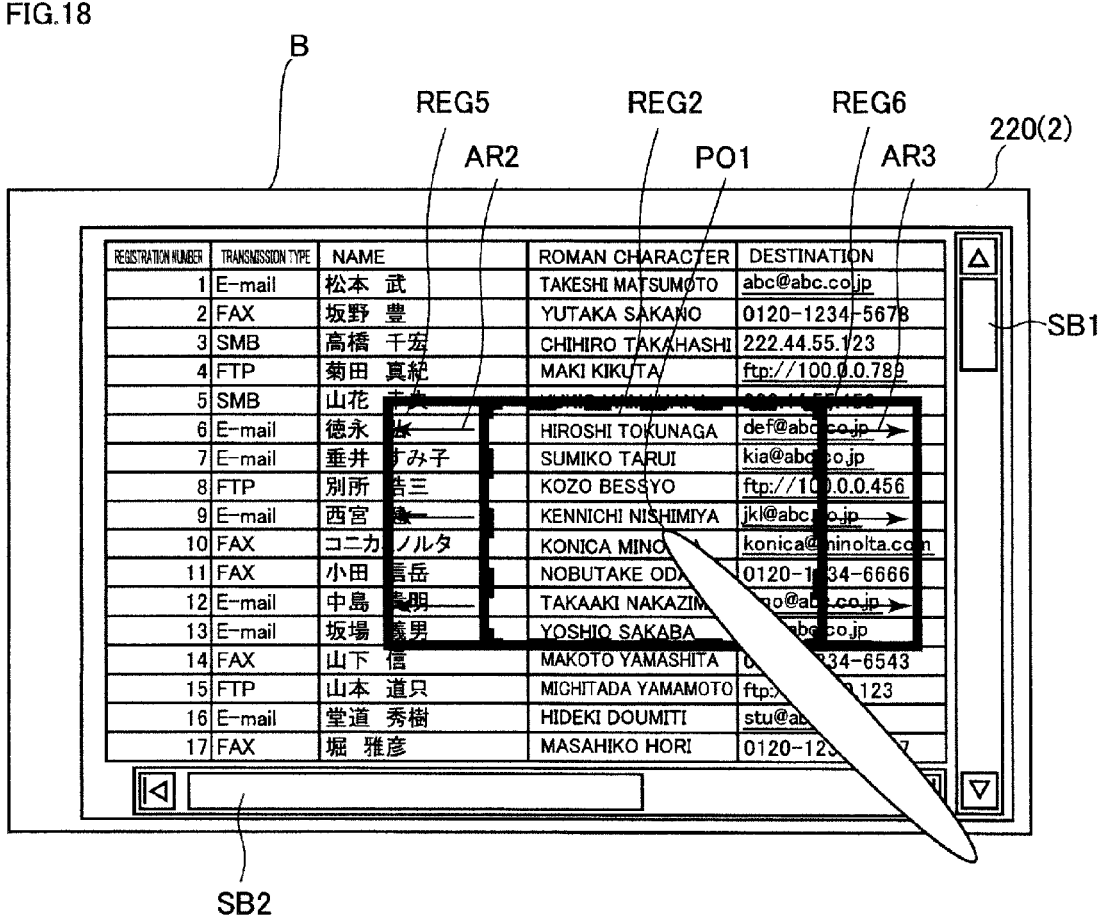
FIG. 18 is a view schematically illustrating a movement area in a fourth embodiment of the present invention.

FIG. 18 is a view schematically illustrating a movement area in a fourth embodiment of the present invention.

Referring to FIG. 18, panel B detects which a right hand or a left hand (the manipulation finger) performs the flick manipulation. Panel A decides the area, which extends on the opposite side to the hand detected from the contact position of the manipulation portion with panel B, as the movement area.

For example, it is assumed that panel B detects that the user performs the flick manipulation by the right hand from position PO1 that is the contact position of the manipulation portion with panel B, and that panel A receives the information on the hand (in this case, the right hand) that performs the flick manipulation. In this case, panel A decides an area REG5 (an area surrounded by a bold line), where area REG2 (the dotted-line rectangular area around position PO1) that is the normal movement area is enlarged in the direction (in this case, the left side) indicated by an arrow AR2 as the movement area. The direction is the opposite direction in which the flick manipulation is performed.

On the other hand, it is assumed that panel B detects that the user performs the flick manipulation by the left hand from position PO1 that is the contact position of the manipulation portion with panel B, and that panel A receives the information on the hand (in this case, the left hand) that performs the flick manipulation. In this case, panel A decides an area REG6 (an area surrounded by a bold line), where area REG2 (the dotted-line rectangular area around position PO1) that is the normal movement area is enlarged from position PO1 in the direction (in this case, the right side) indicated by an arrow AR3 as the movement area. The direction is the opposite direction in which the flick manipulation is performed.

For example, there are two methods for detecting which the right hand or the left hand performs the flick manipulation.

Figure 19:
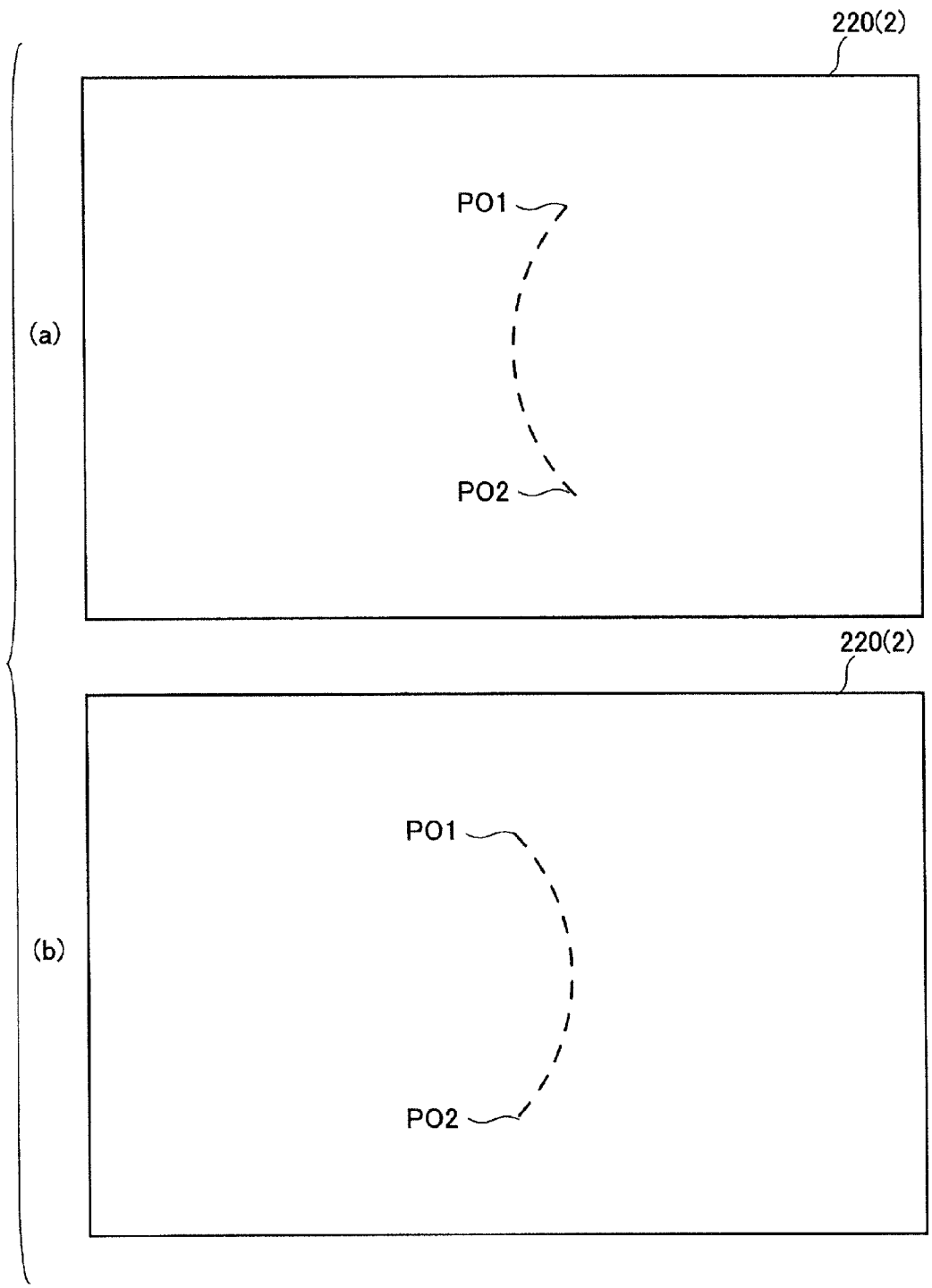
FIG. 19 is a plan view schematically illustrating a first method of detecting a hand that performs the flick manipulation.

FIG. 19 is a plan view schematically illustrating a first method of detecting the hand that performs the flick manipulation.

Referring to FIG. 19, in the case where the user performs the flick manipulation in the vertical direction in FIG. 19 on mobile communication terminal 2, when the right hand performs the flick manipulation, the right hand moves so as to draw an arc about a right elbow. Accordingly, a locus of the flick manipulation becomes a curved line projecting onto the left side as illustrated in FIG. 19A. On the other hand, when the left hand performs the flick manipulation, the left hand moves so as to draw an arc about a left elbow. Accordingly, a locus of the flick manipulation becomes a curved line projecting onto the right side as illustrated in FIG. 19B. Mobile communication terminal 2 can detect which the right hand or the left hand performs the flick manipulation based on whether the locus of the flick manipulation is close to the curved line in FIG. 19A or 19B.

FIG. 20 is a view schematically illustrating an ID information table used in a second method of detecting the hand that performs the flick manipulation.

Referring to FIG. 20, for example, the ID information table is stored in fixed storage device 110 of image forming device 1. In the ID information table, ID information on one user is stored in the horizontal direction (the row direction). "ID number (ID)", "password", "use of MFP" (information on whether the user is permitted to use MFP 100), and "dominant hand" are stored as the ID information. Personal authentication unit 195 performs the processing of authenticating the user based on whether the ID and the password, which are accepted from the user through manipulation panel 130 or mobile communication terminal 2, are included in the ID information table.

For example, as can be seen from the ID information table in FIG. 20, the user having the ID of "12345678" is permitted to use MFP 100, and the right hand is the user's dominant hand. On the other hand, the user having the ID of "32465784" is not permitted to use MFP 100, and the left hand is the user's dominant hand. In the case where personal authentication unit 195 performs the personal authentication of the user, image forming device 1 refers to the ID information on the user, assumes that the user's dominant hand included in the ID information performs the flick manipulation, and can detect which the right hand or the left hand performs the hand flick manipulation.

Figure 21:
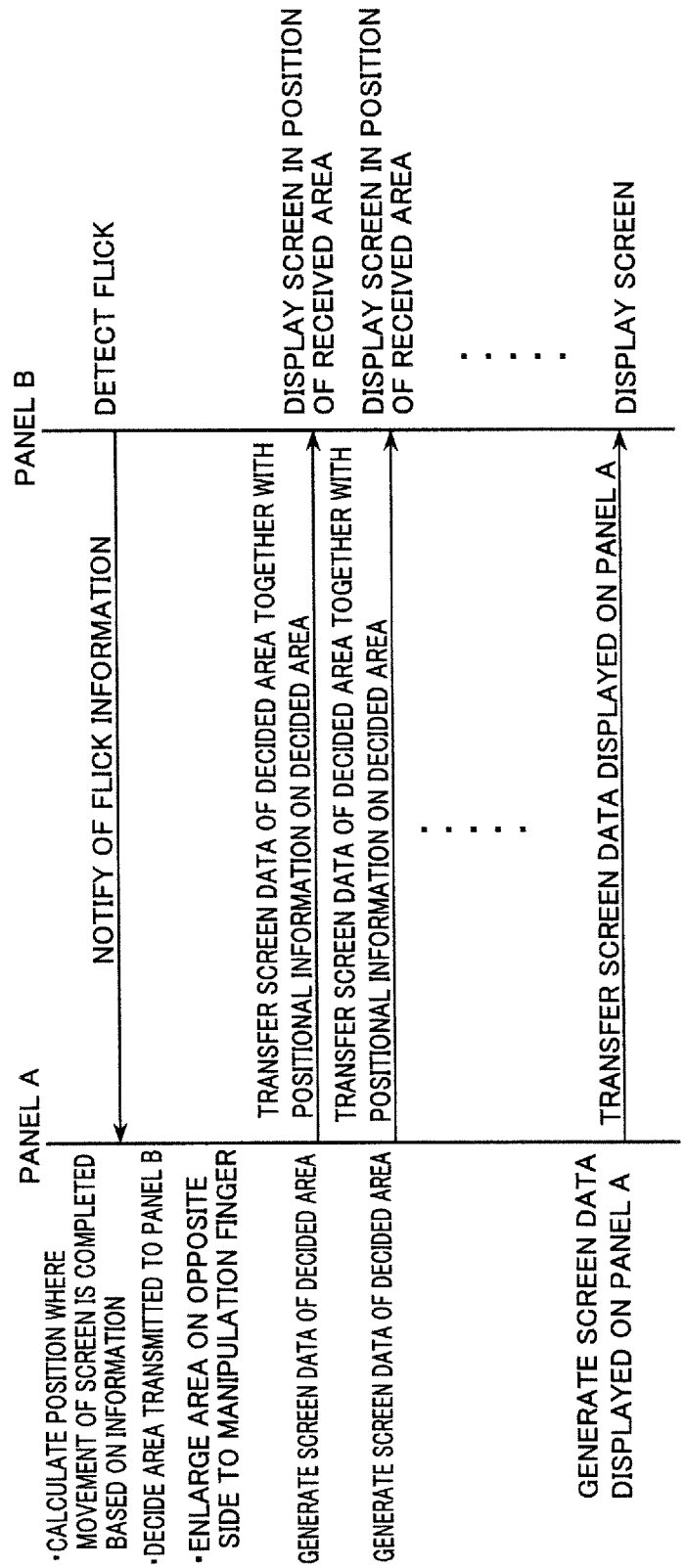
FIG. 21 is a sequence diagram illustrating an example of the communication conducted between the panel A and the panel B in the fourth embodiment of the present invention.

FIG. 21 is a sequence diagram illustrating an example of the communication conducted between panels A and B in the fourth embodiment of the present invention.

Referring to FIG. 21, panel B notifies panel A of the flick information when detecting the flick manipulation on panel B. Based on the received flick information, panel A calculates the position where the movement of the screen is completed (the final position of the screen movement). Then panel A decides the area, where the normal movement area is enlarged in the opposite direction to the hand that performs the flick manipulation (on the opposite side to the manipulation finger), as the movement area (the decided area). Then panel A generates the screen data of the movement area in each screen before the movement is completed since the movement is started, and continuously transfers the screen data of the movement area to panel B together with the positional information on the movement area. Panel A generates the screen data (the screen data displayed on panel A) of the whole movable area by the flick manipulation, which is accepted by panel B as the screen data of the screen in which the movement is completed, based on the flick information, and transmits the screen data to panel B. Panel B displays the screen data every time panel B receives the screen data of one screen.

Figure 22:
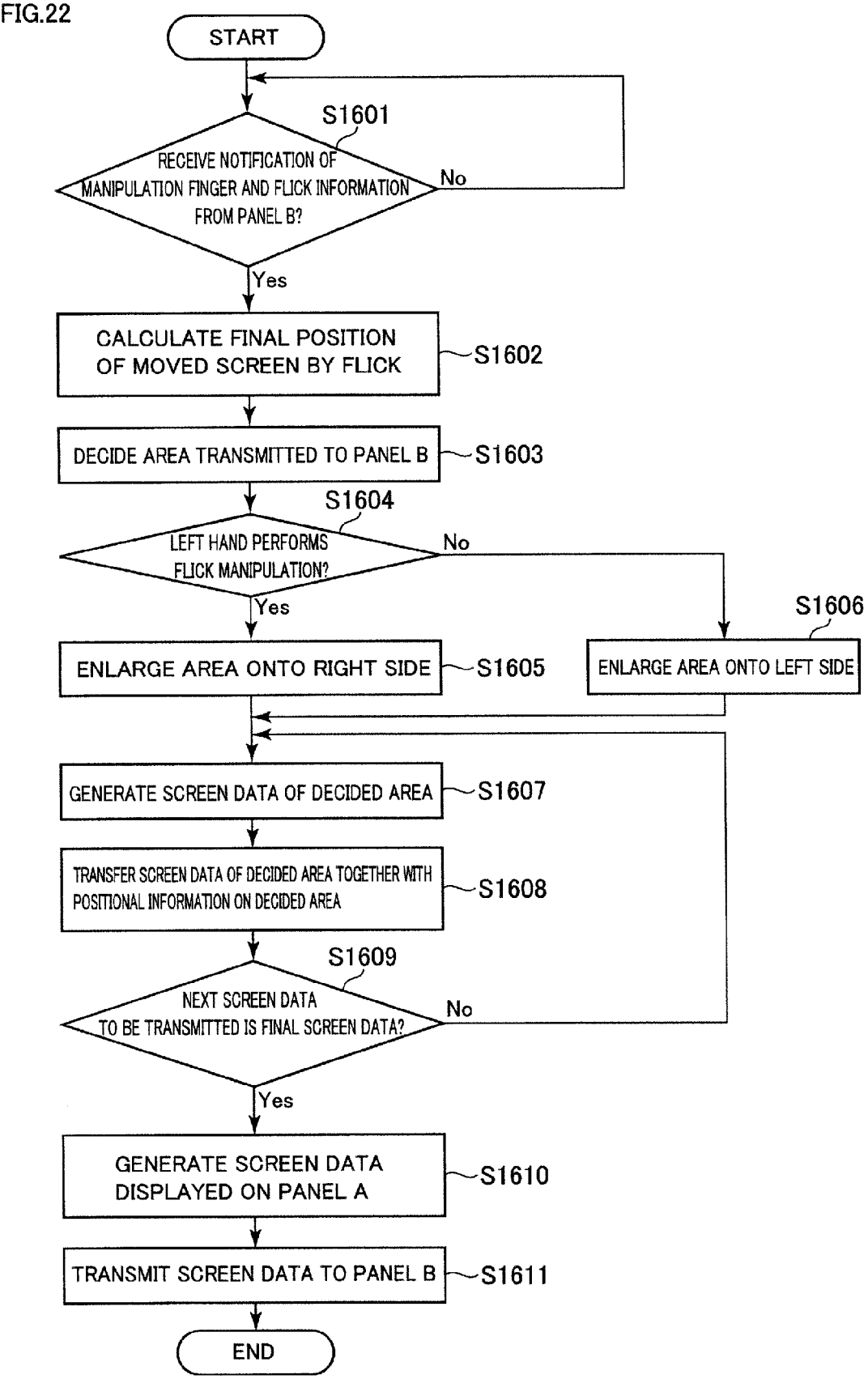
FIG. 22 is a flowchart illustrating an operation of the panel A when the flick manipulation is accepted on the panel B in the fourth embodiment of the present invention.

FIG. 22 is a flowchart illustrating an operation of panel A when the flick manipulation is received on panel B in the fourth embodiment of the present invention.

Referring to FIG. 22, CPU 101 of panel A determines whether panel B notifies panel A of the information on the hand (the manipulation finger) that performs the flick manipulation and the flick information (S1601). In step S1601, when it is determined that panel B notifies panel A of the information on the hand that performs the flick manipulation and the flick information (Yes in S1601), CPU 101 calculates the final position of the screen moved by the flick manipulation based on the flick information (S1602), and goes to processing in S1603. On the other hand, in step S1601, when it is determined that panel B does not notify panel A of the information on the hand that performs the flick manipulation and the flick information (No in S1601), CPU 101 performs the processing in S1601 again (S1601).

In step S1603, CPU 101 decides the normal movement area (the area transmitted to panel B) (S1603). CPU 101 determines whether the left hand performs the flick manipulation (S1604). In step S1604, when it is determined that the left hand performs the flick manipulation (Yes in S1604), CPU 101 decides the area, where the normal movement area is enlarged onto the right side, as the movement area (S1605), and goes to processing in S1607. On the other hand, in step S1604, when it is determined that the right hand performs the flick manipulation (No in S1604), CPU 101 decides the area, where the normal movement area is enlarged onto the left side, as the movement area (S1606), and goes to the processing in S1607.

In step S1607, CPU 101 generates the pieces of screen data until the movement of the movement area is completed since the movement is started based on the received flick information (S1607), and transmits to panel B the positional information on the movement area and the pieces of screen data of the screens until the movement of the movement area is completed since the movement is started (S1608). Then CPU 101 determines whether the next screen data to be transmitted (generated) is the screen data (the final screen data) of the screen in which the movement is completed (S1609).

In step S1607, when it is determined that the next screen data is the screen data of the screen in which the movement is completed (Yes in S1609), CPU 101 generates the screen data (the screen data displayed on panel A, and the normal screen data) of the whole movable area by the flick manipulation, which is accepted by panel B as the screen data of the screen in which the movement is completed (S1610), CPU 101 transmits the screen data to panel B (S1611), and ends the processing. On the other hand, in step S1609, when it is determined that the next screen data is not the screen data of the screen in which the movement is completed (No in S1609), CPU 101 goes to the processing in S1607 to generate the screen data, which is the screen data of the next screen and the screen data in the movement area, based on the screen data stored in fixed storage device 110.

Figure 23:
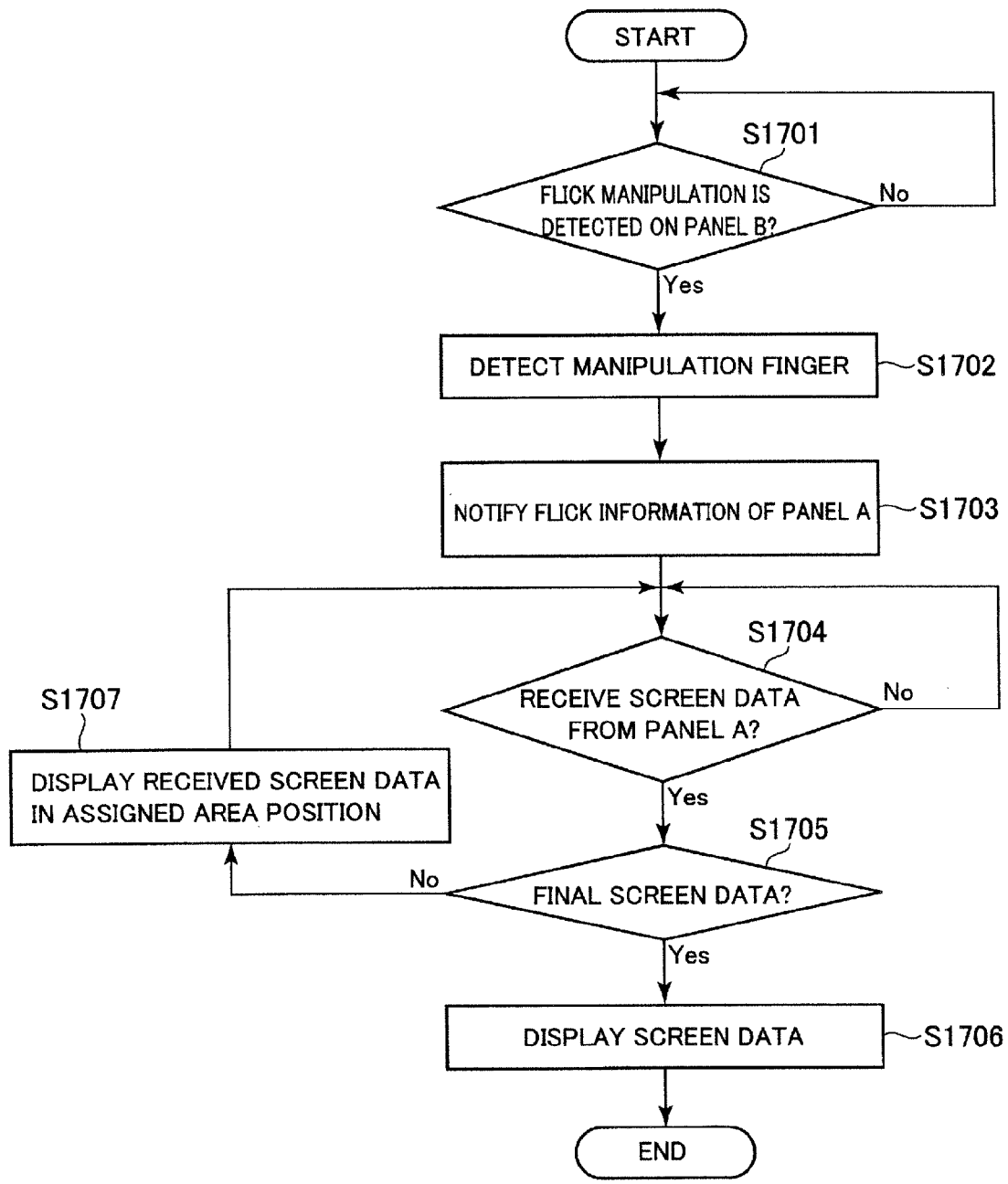
FIG. 23 is a flowchart illustrating an operation of the panel B when the flick manipulation is accepted on the panel B in the fourth embodiment of the present invention.

FIG. 23 is a flowchart illustrating an operation of panel B when the flick manipulation is received on panel B in the fourth embodiment of the present invention.

Referring to FIG. 23, CPU 201 of panel B determines whether the flick manipulation is detected on panel B (S1701). In step S1701, when it is determined that the flick manipulation is detected (Yes in S1701), CPU 201 detects which the right hand or the left hand (the manipulation finger) performs the flick manipulation (S1702). Then CPU 201 notifies panel A of the information on the hand that performs the flick manipulation and the flick information (S1703), and goes to the processing in S1704. On the other hand, in step S1701, when it is determined that the flick manipulation is not detected (No in S1701), CPU 101 performs the processing in S1701 again (S1701).

In step S1704, CPU 201 determines whether the positional information and the screen data of the movement area are received from panel A (S1704). In step S1704, when it is determined that the positional information and the screen data of the movement area are received (Yes in S1704), CPU 201 determines whether the screen data received from panel A is the screen data (the final screen data) of the screen in which the movement is completed (S1705). On the other hand, in step S1704, when the positional information and the screen data of the movement area are received (No in S1704), CPU 201 performs the processing in S1704 again (S1704).

In step S1705, when it is determined that the screen data received from panel A is the screen data of the screen in which the movement is completed (Yes in S1705), CPU 201 directly displays the received screen data on panel B (S1706), and ends the processing. On the other hand, in step S1705, when it is determined that the screen data is not the screen data of the screen in which the movement is completed (No in S1705), CPU 201 displays the received screen data in the movement area (the assigned area position) on panel B (S1707), and goes to the processing in S1704.

In the present embodiment, other operations of panels A and B and the configuration of the display system are identical to those of the first embodiment, the overlapping description is omitted.

According to the present embodiment, the movement area is enlarged in the direction in which the movement area does not overlap the user's manipulation finger, so that the movement area can be prevented from being hardly viewed behind the manipulation finger.

[Others]

In the above embodiments, panel B displays the screen corresponding to the screen displayed on panel A. However, panel A displays any screen and panel B may display a screen different from the screen displayed on panel A.

Figure 24:
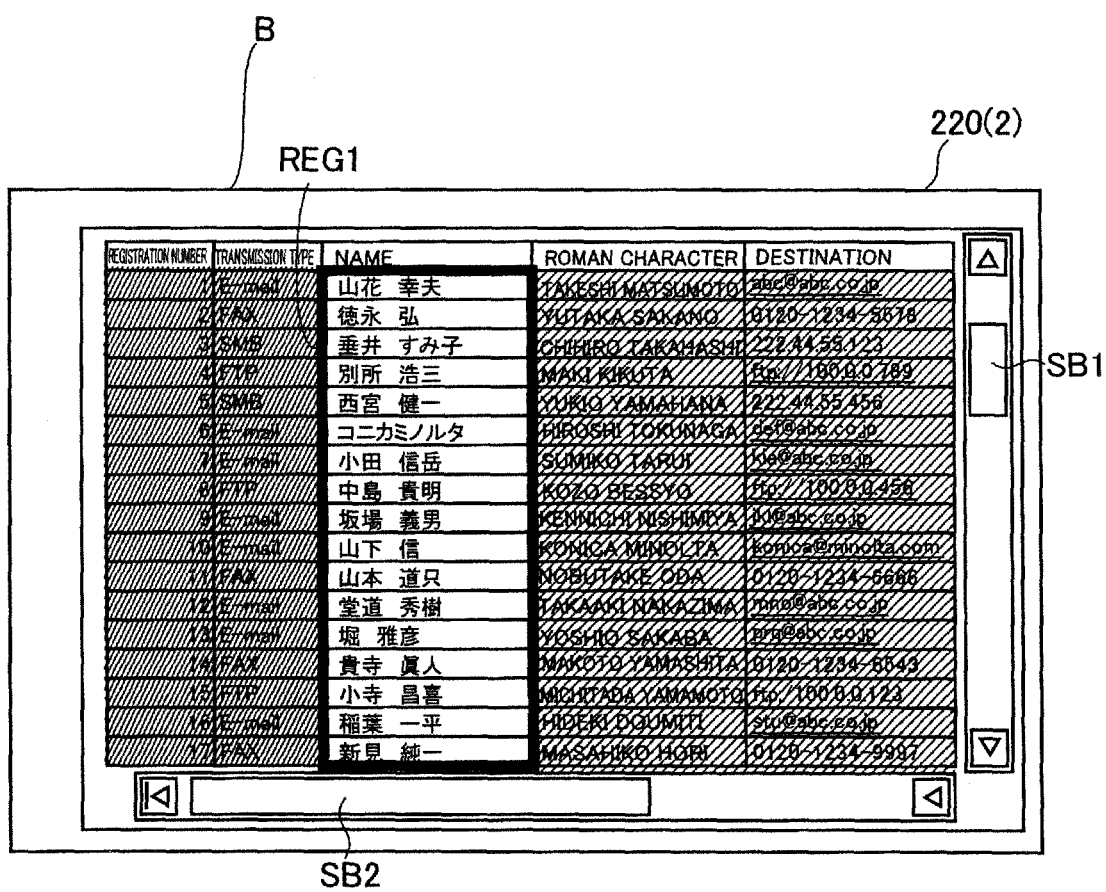
FIG. 24 is a view schematically illustrating a modification of the screen displayed on mobile communication terminal 2 before the movement of the screen is completed since the movement is started (the screen is being moved).

In the above embodiments, in the case where the screen is displayed before the movement is completed (the screen is moving) since the movement is started, panel A displays the screen, which is displayed before the flick manipulation is accepted, in the area except the movement area as illustrated in FIGS. 5(a) and 6(a). However, in the case where mobile communication terminal 2 displays the screen before the movement is completed since the movement is started, panel A may display the screen, which is displayed before the flick manipulation is accepted, in at least a part of the area except the movement area as illustrated in FIG. 24 while graying out the screen. FIG. 24 is a view corresponding to FIG. 5(a), and the grayed-out portion is indicated by hatched lines. In FIG. 24, the items related to the registration number, the transmission type, the roman character, and the destination are grayed out.

The screen, which is displayed by panel A in the area except the movement area before the movement is completed since the movement is started, is held as in the flick manipulation and is not synchronized with the display screen of panel B. Accordingly, the information unnecessary for the user is displayed in the area except the movement area before the movement of the screen displayed on panel A is completed since the movement is started. Therefore, as illustrated in FIG. 24, the area except the movement area is displayed while grayed out, which allows the user to recognize that the area except the movement area is not the current screen to improve the convenience of the user.

Figure 25:
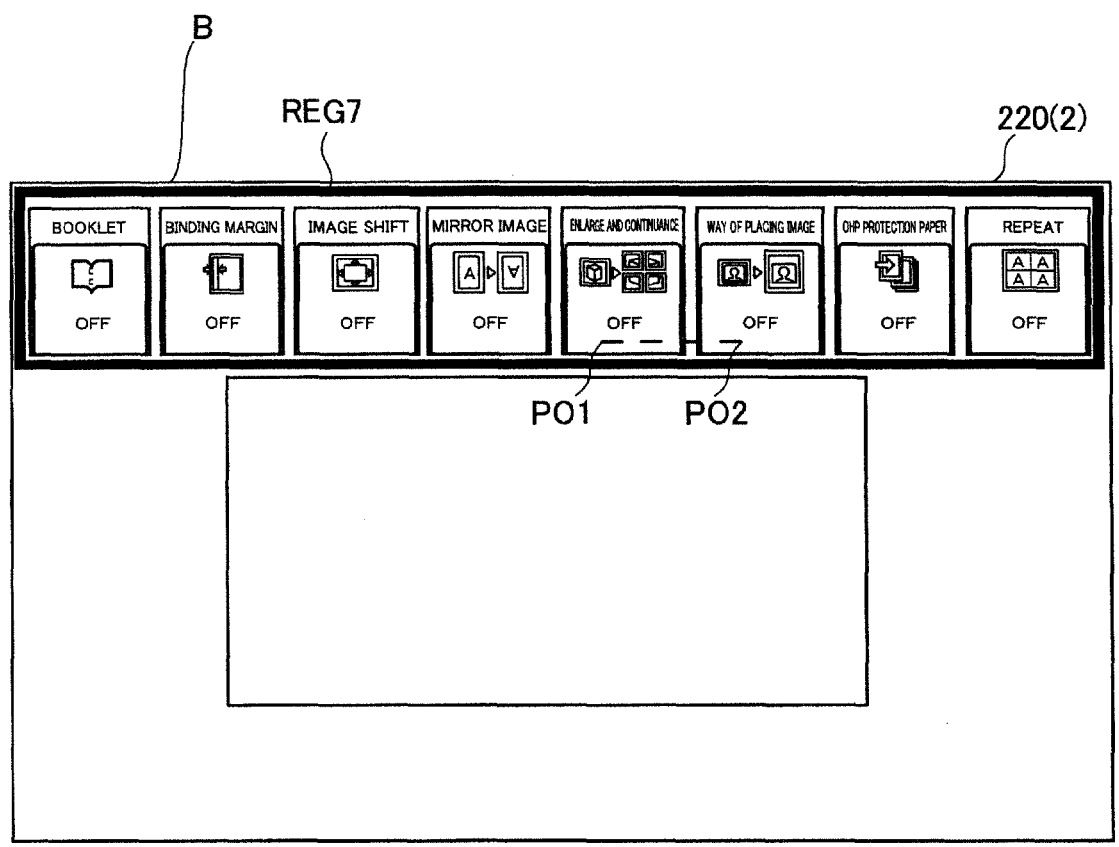
FIG. 25 is a view schematically illustrating another example of the screens displayed on mobile communication terminal 2 and manipulation panel 130 when mobile communication terminal 2 accepts the flick manipulation (before movement of the screen is started).

FIG. 25 is a view schematically illustrating another example of the screens displayed on mobile communication terminal 2 and manipulation panel 130 when mobile communication terminal 2 receives the flick manipulation (before movement of the screen is started).

Referring to FIG. 25, mobile communication terminal 2 displays a job setting screen stored in fixed storage device 110. The job setting screen is a screen that is used to perform the setting related to a job (in FIG. 25, a print job) in image forming device 1. In the job setting screen, a plurality of job names (setting items) are arrayed in the horizontal direction in FIG. 25.

In the case where the flick manipulation is accepted while panel B displays the job setting screen, the job name may be set as the important information, or panel A may decide an area REG7 where the job name is displayed as the movement area. For example, in the case where the setting item displayed on panel B is moved in the right direction in FIG. 25, the user who uses panel B performs the flick manipulation on touch panel 220 so as to move the manipulation portion in the horizontal direction in FIG. 25 from position PO1 to position PO2 along the dotted line in FIG. 25. In this case, panel A decides area REG7 as the movement area, and sequentially transmits the screen data to mobile communication terminal 2 such that the job name displayed in area REG5 moves gradually in the right direction in FIG. 25.

The above embodiments can properly be combined. For example, in the first to fourth embodiments, panel A may display a screen unrelated to the screen (the screen of the screen data transmitted to panel B) displayed on panel B.

The pieces of processing in the above embodiments may be performed by software or performed using a hardware circuit. A program that executes the pieces of processing in the above embodiments may be provided, or the program may be provided to the user while recorded in recording mediums, such as a CD-ROM, a flexible disk, a hard disk, a ROM, a RAM, and a memory card. The program is executed by computers, such as a CPU. The program may be downloaded to the device through communication lines, such as the Internet.

Although the preset invention has been described and illustrated in detail, it is clearly understood that the same is by way of illustration and example only and is not to be taken by way of limitation, the spirit and scope of the present invention being limited only by the terms of the appended claims.

What is claimed is:

1. A display system comprising:
    a first display device in which screen data is stored;
    a second display device for displaying a screen based on the screen data stored in said first display device;
    a manipulation accepting unit of the second display device for accepting a flick manipulation to move the screen through said second display device;
    a first transmitter of the second display device for transmitting flick information on the flick manipulation accepted by said manipulation accepting unit to said first display device;
    an area decision unit of the first display device for deciding a first movable area that is a first part on the screen of said second display device, wherein the first moveable area is distinct from a second movable area that is a second part on the screen of said second display device, display being changed in the first movable area when the screen is moving, and display not being changed in the second movable area when the screen is moving;
    a second transmitter of the first display device for sequentially transmitting positional information on the first movable area decided by said area decision unit and screen data of a screen in the first movable area decided by said area decision unit from said first display device to said second display device, the screen data of the screen being sequential data before the screen movement is completed since the screen movement is started and being decided based on said flick manipulation; and a first display unit of the second display device for displaying a screen in the first movable area of the positional information transmitted by said second transmitter using said second display device based on the screen data transmitted by said second transmitter.

2. The display system according to claim 1, further comprising a third transmitter for transmitting screen data of a screen in which the screen movement is completed from said first display device to said second display device based on said flick information, wherein said third transmitter of the first display device transmits screen data of a whole movable area by the flick manipulation, which is accepted by said manipulation accepting unit in the screen data displayed by said second display device, as the screen data of the screen in which the screen movement is completed.

3. The display system according to claim 2, wherein said third transmitter further transmits screen data of an area except said whole movable area in the screen data displayed by said second display device as the screen data of the screen in which the screen movement is completed.

4. The display system according to claim 1, wherein said area decision unit decides a contact position with said second display device in the flick manipulation accepted by said manipulation accepting unit and an area around said contact position as the first movable area, in which the display is changed when the screen is moving.

5. The display system according to claim 1, wherein, in a case where a screen displayed by said second display device includes important information when said manipulation accepting unit accepts the flick manipulation, said area decision unit decides an area in which the important information is displayed as the first movable area, in which the display is changed when the screen is moving.

6. The display system according to claim 5, wherein, in the case where a screen displayed by said second display device is a destination table including a destination name when said manipulation accepting unit accepts the flick manipulation, said area decision unit decides an area in which the destination name is displayed as the first movable area, in which the display is changed when the screen is moving.

7. The display system according to claim 5, wherein, in the case where a screen displayed by said second display device is a screen in which a setting related to a job including a plurality of setting items is performed when said manipulation accepting unit accepts the flick manipulation, said area decision unit decides an area in which said plurality of setting items are displayed as the first movable area, in which the display is changed when the screen is moving.

8. The display system according to claim 1, further comprising a movement direction detector for detecting a movement direction of the screen from the flick manipulation accepted by said manipulation accepting unit, wherein said area decision unit decides an area, which extends in the movement direction detected by said movement direction detector from a contact position with said second display device in the flick manipulation accepted by said manipulation accepting unit, as the first movable area, in which the display is changed when the screen is moving.

9. The display system according to claim 1, further comprising a manipulation hand detector for detecting which a right hand or a left hand performs the flick manipulation accepted by said manipulation accepting unit, wherein said area decision unit decides an area, which extends onto an opposite side to the hand detected by said manipulation hand detector from a contact position with said second display device in the flick manipulation accepted by said manipulation accepting unit, as the first movable area, in which the display is changed when the screen is moving.

10. The display system according to claim 1, wherein, in a case where a screen based on the screen data transmitted by said second transmitter is displayed in the first movable area of the positional information transmitted by said second transmitter, said first display unit displays a screen, which is displayed before said manipulation accepting unit accepts the flick manipulation, in an area except the first movable area of the positional information transmitted by said second transmitter.

11. The display system according to claim 1, wherein, in a case where a screen based on the screen data transmitted by said second transmitter is displayed in the first movable area of the positional information transmitted by said second transmitter, said first display unit displays a screen, in which a screen displayed before said manipulation accepting unit accepts the flick manipulation is grayed out, in an area except the first movable area of the positional information transmitted by said second transmitter.

12. The display system according to claim 1, wherein the first display device is an image forming device, and the second display device is a display device for displaying a screen based on a screen data stored in said image forming device by wireless communication.

13. A non-transitory, computer-readable recording medium in which a control program of a device is stored, wherein said device includes:

a first display device in which screen data is stored; and a second display device for displaying a screen based on the screen data stored in said first display device, and said control program causes a computer to perform:

a manipulation accepting step of accepting a flick manipulation to move the screen through said second display device;

a first transmitting step of transmitting flick information on the flick manipulation accepted in said manipulation accepting step to said first display device;

an area decision step of deciding a first movable area that is a first part on the screen of said second display device, wherein the first moveable area is distinct from a second movable area that is a second part on the screen of said second display device, display being changed in the first movable area when the screen is moving, and display not being changed in the second movable area when the screen is moving;

a second transmitting step of transmitting sequentially positional information on the first movable area decided by said area decision step and screen data of a screen in the first movable area decided by said area decision step from said first display device to said second display device, the screen data of the screen being sequential data before the screen movement is completed since the screen movement is started and being decided based on said flick manipulation; and a first displaying step of displaying a screen in the first movable area of the positional information transmitted in said second transmitting step using said second display device based on the screen data transmitted in said second transmitting step.

14. The recording medium according to claim 13, further comprising a third transmitting step of transmitting screen data of a screen in which the screen movement is completed from said first display device to said second display device based on said flick information, wherein, in said third transmitting step, screen data of a whole movable area by the flick manipulation, which is accepted in said manipulation accepting step in the screen data displayed by said second display device, is transmitted as the screen data of the screen in which the screen movement is completed.

15. The recording medium according to claim 14, wherein, in said third transmitting step, screen data of an area except said whole movable area in the screen data displayed by said second display device is further transmitted as the screen data of the screen in which the screen movement is completed.

16. The recording medium according to claim 13, wherein the first display device is an image forming device, and the second display device is a display device displaying a screen based on a screen data stored in said image forming device by wireless communication.

17. The recording medium according to claim 16, further comprising a third transmitting step of transmitting screen data of a screen in which the screen movement is completed from said image forming device to said display device based on said flick information, wherein, in said third transmitting step, screen data of a whole movable area by the flick manipulation, which is accepted in said manipulation accepting step in the screen data displayed by said display device, is transmitted as the screen data of the screen in which the screen movement is completed.

18. The recording medium according to claim 17, wherein, in said third transmitting step, screen data of an area except the whole movable area in the screen data displayed by said display device is further transmitted as the screen data of the screen in which the screen movement is completed.

19. A display device comprising:

a storage in which screen data is stored;

a receiver for receiving flick information on a flick manipulation to move a screen from another display device;

an area decision unit for deciding a first movable area that is a first part on the screen of said another display device, wherein the first moveable area is distinct from a second movable area that is a second part on the screen of said another display device, display being changed in the first movable area when the screen is moving, and display not being changed in the second movable area when the screen is moving; and a transmitter for sequentially transmitting positional information on the first movable area decided by said area decision unit and screen data of a screen in the first movable area decided by said area decision unit to said another display device, the screen data of the screen being sequential data before the screen movement is completed since the screen movement is started and being decided based on said flick manipulation.

20. A non-transitory, computer-readable recording medium in which a control program of a display device is stored, the control program configured to:

control the display device to store screen data;

control a receiver of the display device to receive flick information on a flick manipulation to move a screen from another display device;

control an area decision unit of the display device to decide a first movable area that is a first part on the screen of said another display device, wherein the first moveable area is distinct from a second movable area that is a second part on the screen of said another display device, display being changed in the first movable area when the screen is moving, and display not being changed in the second movable area when the screen is moving; and control a transmitter of the display device to sequentially transmit positional information on the first movable area decided by said area decision unit and screen data of a screen in the first movable area decided by said area decision unit to said another display device, the screen data of the screen being sequential data before the screen movement is completed since the screen movement is started and being decided based on said flick manipulation.

* * * * *